US009513769B2

(12) United States Patent
Baumann et al.

(10) Patent No.: US 9,513,769 B2
(45) Date of Patent: Dec. 6, 2016

(54) METHODS AND SYSTEMS FOR NON-LINEAR REPRESENTATION OF TIME IN CALENDAR APPLICATIONS

(75) Inventors: Laurent Baumann, Cupertino, CA (US); Patrick Coffman, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 519 days.

(21) Appl. No.: 13/592,840

(22) Filed: Aug. 23, 2012

(65) Prior Publication Data

US 2014/0059487 A1    Feb. 27, 2014

(51) Int. Cl.
*G06F 3/048*    (2013.01)
*G06F 3/00*    (2006.01)
*G06F 3/0482*    (2013.01)
*G06Q 10/10*    (2012.01)

(52) U.S. Cl.
CPC ........... *G06F 3/0482* (2013.01); *G06Q 10/109* (2013.01)

(58) Field of Classification Search
CPC .... G06F 9/4446; G06F 3/0481; G06F 3/0482; G06F 3/048; H04M 1/72583
USPC ......................................... 715/775, 963, 811
See application file for complete search history.

(56) References Cited

U.S. PATENT DOCUMENTS

| 3,618,032 | A | * | 11/1971 | Goldsberry et al. | .......... | 715/255 |
|---|---|---|---|---|---|---|
| 5,500,938 | A | * | 3/1996 | Cahill et al. | .................. | 715/856 |
| 5,805,444 | A | * | 9/1998 | Seymour | ......................... | 700/16 |
| 6,369,840 | B1 | * | 4/2002 | Barnett | ............ | G06Q 10/06314 |
| | | | | | | 715/751 |
| 6,466,236 | B1 | * | 10/2002 | Pivowar et al. | .............. | 715/835 |
| 7,363,590 | B2 | * | 4/2008 | Kerr et al. | ..................... | 715/759 |
| 7,526,192 | B2 | * | 4/2009 | Nakahara | ...................... | 396/104 |
| 7,574,665 | B2 | * | 8/2009 | Cortright | ...................... | 715/768 |
| 7,689,698 | B2 | * | 3/2010 | Hullot et al. | ................. | 709/228 |
| 2003/0034990 | A1 | * | 2/2003 | Roelofs | ................ | G06T 11/206 |
| | | | | | | 345/660 |

(Continued)

OTHER PUBLICATIONS

Craig Wickesser, Case Study: Eclipse Rich Ajax Platform Use at CAS Software AG, Feb. 1, 2009, InfoQ, pp. 1-10.*

(Continued)

*Primary Examiner* — Jennifer To
*Assistant Examiner* — Hugo Molina
(74) *Attorney, Agent, or Firm* — Schwegman Lundberg & Woessner, P.A.

(57) ABSTRACT

Methods and systems for displaying increments of time in a calendar view. Method receives a selection of commonly-used increments of time for the calendar and allots equal amounts of display space in the calendar view for each commonly-used increment. The method allots less display space for other increments of time that are not commonly-used as compared to space allotted for the commonly-used increments. In another embodiment, a system presents a calendar view having a plurality of increments of time and events in a display. The system includes an input device for receiving a selection of commonly-used increments of time and a processor configured to alter the calendar view by displaying the commonly-used increments of time linearly with equal amounts of display size for commonly-used increments of time and decreasing the size of other increments of time in proportion to their proximity to commonly-used increments.

25 Claims, 17 Drawing Sheets

(56) References Cited

U.S. PATENT DOCUMENTS

| | | | |
|---|---|---|---|
| 2006/0053392 A1* | 3/2006 | Salmimaa | G06F 3/04817 715/864 |
| 2007/0265933 A1* | 11/2007 | Steigelfest | 705/26 |
| 2008/0175104 A1* | 7/2008 | Grieb | G06Q 10/109 368/29 |
| 2009/0177995 A1* | 7/2009 | Gould | 715/786 |
| 2010/0082624 A1* | 4/2010 | Martin et al. | 707/737 |
| 2010/0162105 A1* | 6/2010 | Beebe et al. | 715/273 |
| 2011/0022426 A1* | 1/2011 | Eijdenberg et al. | 705/5 |
| 2011/0122078 A1* | 5/2011 | Kasahara | G06F 3/0488 345/173 |

OTHER PUBLICATIONS

Rob Lightner, How to compress unused hours in Google Calendar, Nov. 30, 2011, CNET, pp. 1-2.*

Microsoft Outlook 2010 Inside Out Chapter 19, Aug. 15, 2010, pp. 1-8.*

* cited by examiner

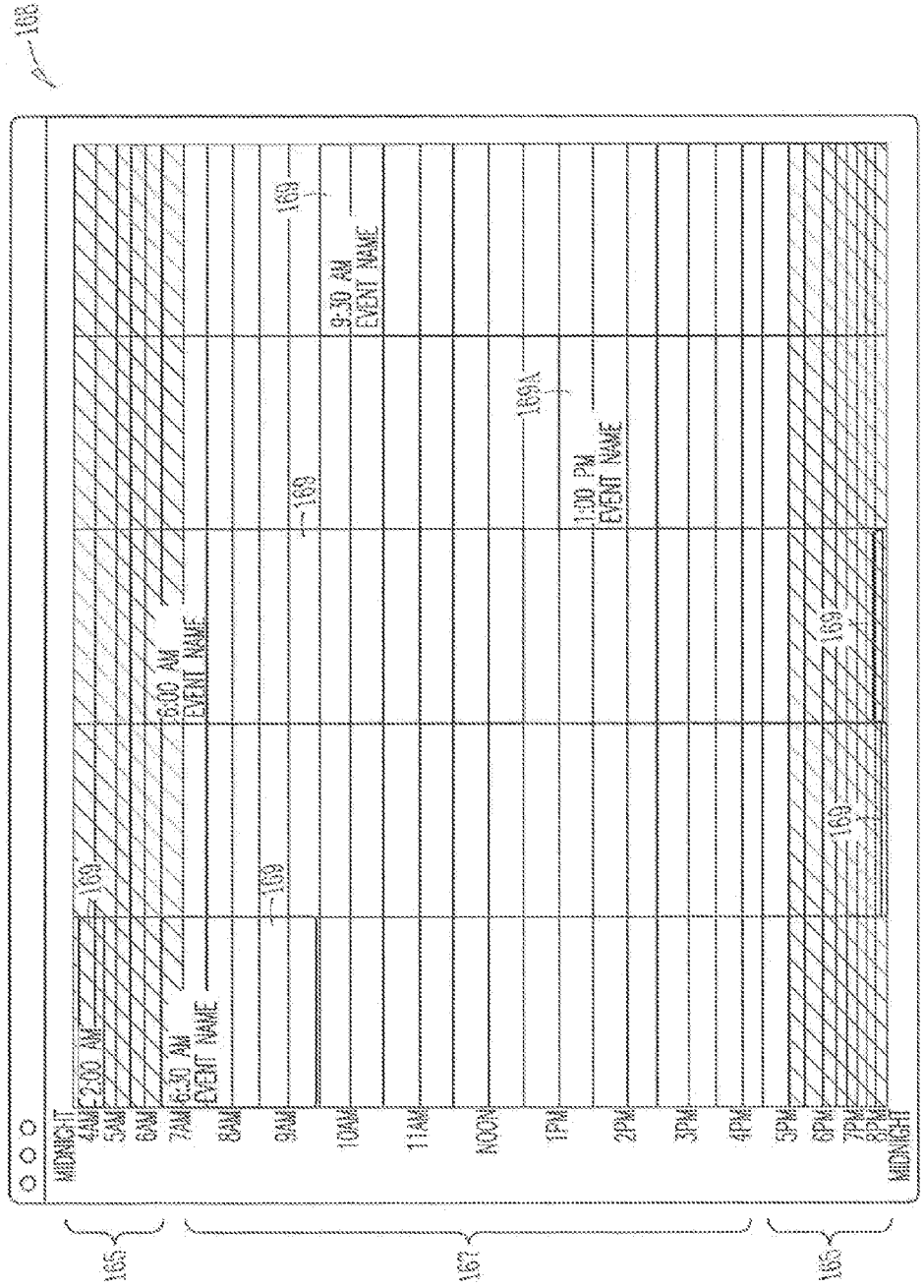

METHODS AND SYSTEMS FOR NON-LINEAR REPRESENTATION OF TIME IN CALENDAR APPLICATIONS

FIELD OF THE INVENTION

The present disclosure is directed to the retrieval and display of date-based data in a computing system, and more particularly to a user interface that provides a user with access to calendar and appointment data.

BACKGROUND OF THE INVENTION

Conventionally, a user's computing experiences with calendar applications were typically focused upon a particular device within a given environment. For instance, the user might interact with a calendar application running on a desktop computer in the work environment, to view, create and modify work-related calendar events such as appointments, conference calls, and meetings. Such events are often scheduled during commonly-used hours, such as the user's regular work hours. However, many events are scheduled outside commonly-used hours or increments of time. For example, a user might also have a home computer for viewing, creating, and modifying personal calendar events. In addition to a home computer, the user might employ a mobile computing device, e.g., a smart phone, and/or a portable computer, e.g., a laptop computer or tablet computer, for use in both the work and home environments. In either case, the calendar entries that the user created, edited or accepted were typically stored on the user's computing device, or accessed via a network to which the computing device was connected.

Users of mobile devices with calendar applications are often unable to efficiently display calendar events such as meetings and appointments due to the limited display sizes of mobile devices. Although response time and ease of navigation is critical to the usefulness of user interfaces (UIs), UIs for current mobile operating systems and platforms are unable to display views of calendar applications (i.e., ranges of days, weeks, and months) without either hiding or minimizing 'off-hour' time increments. Traditional UIs for calendar applications that attempt to display calendar views spanning large durations (i.e., several days, weeks, or months) typically subject users to delays as they attempt to navigate calendar views. This problem is compounded when increments of 'off hours' time (i.e., late evening and early morning hours) are given equal display space alongside 'peak' or commonly-used 'core' time increments (i.e., business hours for a user).

Advances in the capabilities of mobile computing devices allow users to access both personal and work-related calendar information from almost anywhere, without needing access to work or home computers. Such users can use these devices to subscribe to one or more calendars so that they can view and modify calendar appointments while, for example, traveling from one physical location to another. This is particularly advantageous in a business environment, where mobile devices are prevalent and are commonly used to create, disseminate, and accept events such as appointments and meeting requests. Many business users from diverse occupations rely on the devices to access data from calendar applications and event databases or data stores while away from the office. Some subset of enterprise calendar event data is commonly downloaded, or synchronized, to these mobile devices for viewing and interacting with the calendar entries (i.e., accepting, declining, and altering appointment requests) in user interfaces on the mobile devices.

While the relatively small size of a mobile device aids in portability, the size may also prove to be a hindrance for some users and applications, particularly for mobile users who need to view data from calendar applications, such as, but not limited to the iCal application developed by Apple Inc., the calendar feature of Microsoft Outlook, and the Google Calendar component of Gmail from Google, Inc.

Despite advances in mobile technology, mobile devices typically have greater limitations on display size, memory capacity, data storage capacity, central processing unit (CPU) capacity, and networkability than desktop and laptop computers. Due to these limitations, some mobile device operating platforms with touch screen interfaces, such as the iOS operating system (OS) developed by Apple Inc., the Android platform from Google Inc.; and the Blackberry OS from Research In Motion ("RIM") and similar mobile operating systems cannot efficiently display large ranges of dates and times (i.e., appointment data for a 24-hour period) in a single view. These limitations present challenges when different portions of calendar data needs to be displayed in response to user scrolling or navigation inputs within a user interface (UI) of a mobile device. Given the versatility of mobile devices, it is desired to implement a means by which these mobile devices can efficiently retrieve and display subsets of calendar data from server-side databases and efficiently display these subsets in the context of potentially intermittent, unreliable, occasionally-connected, variable speed (quality of service/QoS), or temporarily-unavailable networking capabilities.

As more and more enterprise calendar applications perform calendar database synchronizations from an application server to mobile devices, mobile device user interfaces are called upon to efficiently display larger and larger calendar datasets. Despite advances in the central processing units (CPUs), memory capacity, and storage capacity realized with newer mobile devices, mobile applications consuming large amounts of memory to handle calendar applications still degrade the user experience on mobile platforms. For example, traditional techniques for displaying a calendar view spanning many days or weeks that perform adequately on larger displays of servers, workstations, and personal computers are not well suited for platforms with smaller displays such as tablet computers and other mobile devices. Some mobile operating systems (OSs) and mobile versions of calendar applications and websites attempt to address this issue by displaying only a small subset of a calendar or allowing a user to manually zoom in on calendar entries. However, drawbacks of these techniques is that some calendar entries (i.e., scheduled events) may not be readily visible or legible in a calendar view.

A traditional technique for displaying data from calendar applications on mobile platforms relies on 'just in time' data retrieval and rendering whereby rows or columns of time increments and event data are fetched and displayed as a user navigates to a given duration (i.e., scrolls to a given day, week or month). However, fetching and rendering event data as a user scrolls or otherwise navigates to a duration often results in unacceptably slow UI response times due to delays associated with such just in time retrieval and display in wireless environments.

A conventional technique to mitigate calendar UI response issues is to display calendar view data and entries (i.e., appointments and meetings) that is stored in a local dataset or data store on the client device. However, one drawback of this technique is that many client devices, particularly mobile devices, lack native calendar applications and/or sufficient local storage and display space to render a calendar UI for a large range of time (i.e., several weeks or months of appointments and events). For example, many calendar applications are web-based and do not include native applications that are locally-installed on client devices. Even for client devices with native calendar applications and ample local storage, traditional display techniques are unable to efficiently display designated 'core' or 'commonly-used' time increments and their associated calendar entries in a manner that is legible to users. Even with a relatively fast local native calendar data store, this technique can result in stale event data being displayed without resource intensive event data synchronization to keep the calendar data store up to date on a client device. Another disadvantage to this technique is a UI delay experienced by users while large sets of event data are retrieved, stored locally, and rendered.

Despite increased database performance achievable through indexing and query optimization, traditional database implementations in mobile environments are unable to scale up to handling synchronization and display of large amounts of calendar data without noticeable performance issues such as UI delays and lags.

Traditional techniques make it difficult for users to browse or view large time ranges for calendar applications that extend beyond the current viewing area of a mobile device screen. Such a limitation makes traditional techniques inapplicable to applications that need to display long time ranges, such as 24 hours of a day, 7 days of a week, or all days of a month, on relatively small display screens of mobile devices.

Another traditional technique for displaying calendar views on a client device is to use calendar applications whose interfaces hide, omit, minimize, or otherwise do not display non-core time increments, such as weekends, late evening hours, and/or early morning hours. With such traditional calendar applications and interfaces, if a user has accepted an appointment for a time outside of commonly-used time increments, such as from 9 pm to 10 pm, the late evening event would not be visible (out of the calendar view). As a result, the user may overlook and miss off-hours calendar events.

Accordingly, what is desired is the ability to display calendar data from on client devices such as mobile devices in an efficient manner.

What is further needed are systems, methods, and computer program products for reacting to a user's scrolling and touch gestures in a calendar application interface and efficiently displaying all time increments for a given duration (i.e., 24 hours of a day) while a user browses and navigates through a calendar view. As displays of mobile devices often have limited space available for applications, what is further needed is the ability for efficient calendar displays that make better use of available space (i.e., available display 'real estate') to enable calendar applications to display larger ranges of time. What is further needed is the ability to react to user touch gestures within a touch screen user interfaces and optimally display calendar entries so that commonly-used time increments (i.e., working hours of a business day) and their corresponding entries are legible on a mobile device's screen while simultaneously displaying the other time increments.

SUMMARY OF THE INVENTION

Embodiments disclosed herein enable display of all time increments for a given duration, such as 24 hours of a day, in a way that compresses commonly unused hours, such as early morning and late evening time increments, and focuses on the commonly-used hours, such as regular business hours, without completely hiding or minimizing the commonly unused hours.

In one embodiment, late evening and early morning appointments in other increments of time outside of a user's designated 'commonly-used' time increments remain visible, but compressed at the top or bottom of a vertical calendar view of a calendar application user interface. In another embodiment, calendar events in other increments of time outside of 'commonly-used' time increments remain visible, but compressed at the left or right of a horizontal calendar view. In this way, the presently disclosed 'non-linear' calendar view reduces the likelihood that a user will overlook or miss calendar events scheduled during these 'other' time increments.

The non-linear view is suited for calendar applications used to represent various durations, such as a day, a week, a month, or a succession of days, weeks, or months.

In another embodiment, a method 'zooms up' or magnifies a section of a calendar view that a user has scrolled to or hovered in proximity to in order focus attention on a selected time increment, such as a certain hour of a day. In this way, the non-linear calendar view dynamically magnifies a certain part of itself in response to a user selection or detecting 'hovering' near a given time increment. Exemplary systems and methods for magnifying items in a dock and userbar are described in U.S. Pat. No. 5,657,049, entitled, "User Interface for Providing Consolidation and Access," the disclosure of which is incorporated here by reference in its entirety.

Embodiments disclosed herein include methods, systems, and computer program products for efficient display of calendar data within a user interface (UI) of a client device, such as, but not limited to a mobile device. As a user scrolls, navigates, or gestures in any direction (i.e., up/down or left/right) within a calendar view to traverse durations (i.e., days, weeks, or months), embodiments of the invention dynamically fetch additional calendar data so as to give the user the impression that the additional calendar data is already loaded and available to be displayed/viewed. For example, calendar data needed to render 'scroll behind' and 'scroll ahead' calendar views adjacent to a currently-displayed calendar view are fetched when user navigates to given duration. Such scroll ahead and scroll behind durations include fetched data corresponding to one duration of calendar data prior to and one duration of calendar data after the currently viewed duration. The methods, systems, and computer program products build a non-linear calendar view comprising linearly-displayed rows or columns corresponding to commonly-used time increments and non-linearly-displayed other increments of time by invoking modules. In an embodiment, the modules reside on a mobile device. The modules fetch event data and additional calendar data needed to display a calendar view from a database resident on a calendar application server. In an embodiment, the fetched events for a duration of interest are then locally stored in a data store akin to a result set after a search or query is executed and the result set fetched.

Embodiments of the invention allow user input via a hand (in the case of a touch-sensitive display or touch screen interface) or another input device such as, but not limited to, a mouse or stylus, in order to interact with a user interface to instruct it to show calendar information, which is then rendered in a calendar view. In an embodiment, this process may continue repeatedly for multiple iterations during a calendar application session on a client device. For example, the touch interface of the iCal application running on an iOS platform enables a user to slide a finger and scroll backwards or forward in time in a calendar view to browse multiple durations (days/weeks/months). A calendar view might scroll slowly or rapidly based on slow or rapid touch screen events sent to a client application with each slide gesture. Embodiments of the invention efficiently handle display of event data from calendar applications on mobile devices having limited display sizes. For example, to display 24 hours of a day, a mobile device may only be able to display commonly-used hours legibly only if other, 'off hours' are allotted less display space. Embodiments enable a user to scroll through a calendar view to browse across a succession of durations (i.e., multiple days, weeks or months), while keeping all time increments for the given duration visible in a user interface. A user can also scroll through a calendar view slowly, rapidly, or not at all. A user may also select or hover over only a few entries or time increments out of tens or hundreds of time increments and event records available via the calendar application. In embodiments, all of these scrolling and navigation scenarios are handled without subjecting the user to significant delays before the desired calendar data can be viewed.

Embodiments of the invention additionally include a method that efficiently handles navigation and display of a large calendar dataset within a UI of a client device by invoking functions in order to fetch subsets of a calendar database from a server. The method comprises storing, in a local data store on the client device, pertinent event data based on user calendar preferences, navigations, and event or date searches/queries. In an embodiment, the local data store is defined based upon a query or search initiated in a calendar view on a client device. For example, a navigation or scroll gesture within a calendar application on a client device can result in a large amount of event data, which may be stored in an event database a calendar application server. The method further comprises invoking a function to initialize a non-linear calendar view. In an embodiment, the initialized non-linear calendar view allocates an equal amount of display space, such as a row height or column width (e.g., in pixels) to each commonly-used time increment and less space to other time increments.

Embodiments of the invention additionally include a computer-readable medium having computer-executable instructions stored thereon that, if executed by a computing device, cause the computing device to perform operations for efficiently displaying data from a calendar application on a client device, such as, but not limited to, a mobile device.

Embodiments of the invention include a system that efficiently displays calendar event data on a client device such as, but not limited to, a mobile device. The system includes a UI on a client device to display data from calendar application data from a remote event database, wherein the displayed data is part of a non-linear calendar view comprising linearly-displayed commonly-used increments and non-linearly-displayed other increments on the client device. The system includes modules configured to fetch event data from a server needed to render a non-linear calendar view on the client device. In one embodiment of the invention, the modules are resident on the client device as part of a calendar application. In response to detecting navigation inputs or scrolling gestures within a UI on the client device, the system invokes a fetching module to fetch event data from a server event database corresponding to a calendar subscription, query or navigation input from a client device. In an embodiment, the system comprises an initialization module on the client device configured to initialize and render a non-linear calendar view based on designated commonly-used increments of time in the UI on the client device. In one embodiment, the modules resident on the client device are written in a script language that can be read by mobile devices including, but not limited to, mobile devices running the iOS operating system. In exemplary non-limiting embodiments, the modules can be written in JavaScript and/or markup languages, such as, but not limited to HyperText Markup Language (HTML), Extensible Markup Language (XML), and XHTML (Extensible HyperText Markup Language).

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWING FIGURES

The accompanying drawings, which are incorporated herein and form a part of the specification, illustrate the present invention and, together with the description, further serve to explain the principles of the invention and to enable a person skilled in the relevant art to make and use the invention.

FIGS. 3-10 illustrate an exemplary graphical user interface (GUI), wherein non-linear calendar views can be displayed, in accordance with embodiments of the invention.

Figure 1:
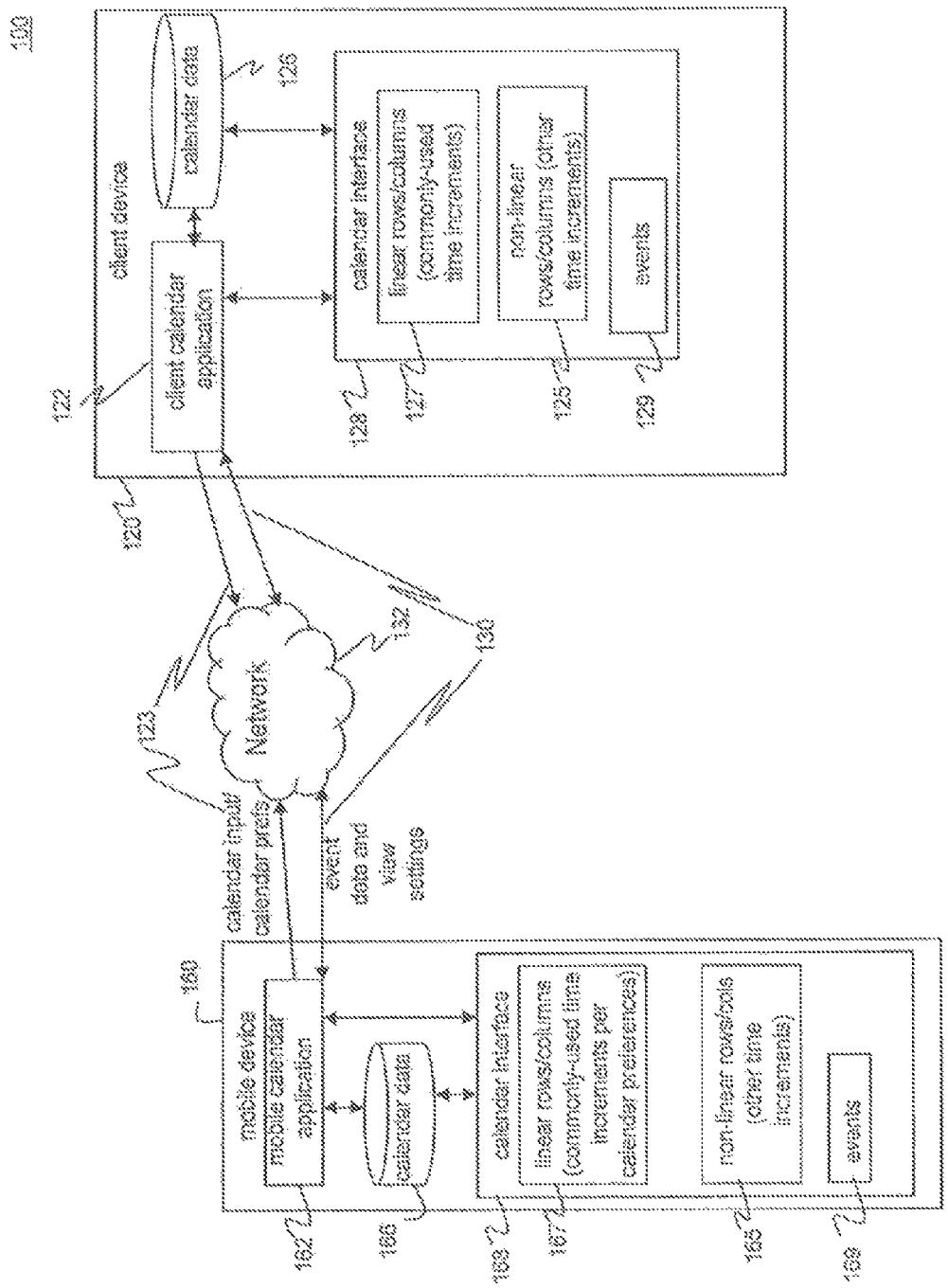
FIG. 1 is a diagram of an exemplary system architecture in which embodiments can be implemented.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

Embodiments disclosed herein include methods, systems, and computer program products for efficient display of calendar data within a user interface (UI) of a client device, such as, but not limited to, a mobile device. The methods, systems, and computer program products display all time increments for an entire duration (i.e., a day, week, or month) within a calendar view without hiding or omitting time increments or calendar events. As a user scrolls, navigates, or gestures in any direction (i.e., up/down or left/right) within a calendar view to navigate through multiple durations, embodiments of the invention efficiently and dynamically fetch additional events from a database or data store so as to readily display calendar events scheduled during the navigated-to durations. For example calendar events occurring within, 'scroll behind' and 'scroll ahead' durations for previous or subsequent days, weeks, or months, are fetched when a user navigates to the durations. Such scroll ahead and scroll behind calendar views include fetched calendar data corresponding to time durations prior to and after the currently calendar view. The methods, systems, and computer program products build a 'non-linear calendar view' comprising linearly-displayed commonly-used time increments and compressed, non-linearly-displayed other time increments by invoking modules. In an embodiment, the modules reside on a client device such as a mobile device. The data fetching and displaying methods, systems, and computer program products serve as a mechanism to efficiently display portions of calendar data from servers as users of client devices navigate through a non-linear calendar view.

Embodiments of the invention enable user interaction with a calender application user interface in a touch-sensitive display. For example, embodiments allow interaction via a hand (in the case of a touch screen interface) or another input device such as, but not limited to, a mouse or pointing device, with the user interface to instruct it to display and magnify certain calendar information, which is then rendered in a non-linear calendar view. In an embodiment, this process may continue repeatedly for multiple iterations during a calendar application session on a client device. For example, the touch interface of the iOS running on an iPod™, iPad™ or iPhone™ platform enables a user to slide a finger and scroll down (i.e., forward in time) to view events and calendar data for future dates. A calendar view might scroll slowly or rapidly based on slow or rapid touch screen events sent to a client application with each slide gesture. Embodiments of the invention efficiently handle display of data from calendar applications on mobile devices having limited display of data from calendar applications on mobile devices having limited display sizes without hiding or omitting increments of time. For example, if a user wishes to view all 24 hours of a given day, a mobile device may only be able to legibly display a subset of the 24 hours unless other hours are allotted less display space than the subset of the 24 hours unless other hours are allotted less display space than the subset. A user can scroll through a calendar view to read tends, possibly hundreds of events scheduled during a succession of days, weeks or months, but only designated commonly-used time increments will be allotted an equal amount of display space. A user can also scroll through a calendar view slowly, rapidly, or not at all. A user may also browse only a few events instead of thousands of records in the calendar view at that time. In an embodiment, all of these scrolling and navigation scenarios are handled without subjecting the user to significant delays and without omitting, hiding, or minimizing other increments of time as the commonly-used increments of time are rendered and displayed.

Embodiments additionally include a method that efficiently handles navigation and display of a large number of time increments within a UI of a mobile device by invoking functions in order display a subset of the time increments in a non-linear manner. The method comprises storing, on a client device, a subset of calendar data, such as event information, of a larger, server-side calendar database. In an embodiment, the subset is defined based upon a navigation or search (i.e., query) initiated on the client device. For example, an event search or calendar navigation on a mobile device can result in the definition of a large subset of time increments across multiple durations (i.e., spanning successive days, weeks or months). The method further comprises invoking a function to initialize a non-linear calendar view. In an embodiment, the initialized non-linear calendar view displays the total number of time increments for a given duration (i.e., 24 hours of a day) wherein the height or width (e.g., in pixels) of each commonly-used time increment is the same for corresponding rows/columns in the UI of the client device. The initialized view is then altered to allot less space to other increments of time.

The method further comprises detecting scroll and navigation inputs, such as, but not limited to sliding and hovering gestures, and determines the velocity of the scrolling/navigation in a calendar application. Based on the velocity, or in the case of hovering, a decrease in velocity, the method renders an appropriate calendar view and continues to display all increments of time for a duration that has been navigated to. In an embodiment, the predicted scroll/navigation velocity is determined by user gestures within the UI and past and current scroll speeds. For example, in mobile devices having a touch screen user interfaces (UIs), the detected rapidness of a finger slide gesture results in a longer scroll. Predicted scroll/navigation velocity can also be determined by detecting the forcefulness of gestures. For example, detected forcefulness of slide gestures can be used to determine the predicted scroll/navigation velocity. Such forcefulness can be measured, for example, as a coefficient of friction for a touch screen slide gesture. Upon detecting that the scrolling/navigation has ended, the method fetches and displays a calendar duration the user has navigated to in the calendar view of the UI on the mobile device. Upon detecting a selection of, navigation to, or hovering in proximity to a given increment of time, the method magnifies a section of the calendar view that the user has navigated to, hovered near, or selected in order to focus attention on the given time increment, such as a certain hour of a day. As a result of such magnification or zooming in, the method may dynamic reposition the remaining increments of time in the current calendar view so as to provide sufficient display space for the magnified time increment. In embodiments, such navigation, selection, and hovering can also trigger centering the given time increment within a calendar view.

Embodiments of the invention additionally include a computer-readable medium having computer-executable instructions stored thereon that, if executed by a computing device, cause the computing device to perform operations for efficiently displaying data from calendar applications on client devices, such as, but not limited to, mobile devices.

Embodiments of the invention include a system configured to display calendar data in a non-linear fashion on a client device, such as, but not limited to, a mobile device. The system includes a UI on a client device to display calendar data using a calendar application, wherein the calendar data is a retrieved or synchronized subset of a remote calendar database. The system displays the retrieved calendar data within a non-linear calendar view comprising linearly-displayed commonly-used time increments, and non-linearly-displayed other time increments. The system includes modules configured to retrieve and display calendar events such as appointments from a server. The retrieved events are used to populate a calendar data store on a client device that renders a non-linear calendar view on its display. In one embodiment of the invention, the modules are resident on the client device as part of a calendar application. In response to detecting navigation inputs, scrolling gestures, or hovering within a UI on a client device such as a mobile device, the system invokes a calendar application module to retrieve and display calendar events from a server database corresponding to calendar input and preferences received from the mobile device. In one embodiment, the modules resident on the mobile device are written in a script language that can be read by mobile devices including, but not limited to, mobile devices running the iOS operating system. In exemplary non-limiting embodiments, the modules can be written for web-based calendar applications using JavaScript, HTML, XML, and/or XHTML.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

TABLE OF CONTENTS

I. Introduction
II. Non-linear Calendar View Display Architecture and System
III. Example User Interface for Non-linear Display of Calendar Data
IV. Non-linear Calendar Display Methods
V. Example Computer System Implementation
VI. Conclusion

I. INTRODUCTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

The present invention relates to systems, methods, and computer program products for efficiently displaying calendar data on mobile client devices wherein the calendar data comprises a plurality of subsets of enterprise calendar data selected from a large dataset residing on a remote server. Embodiments relate to graphically displaying and presenting a calendar view of a large calendar dataset quickly on the limited content viewing area of a mobile device.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "display," "display screen," and "screen" are used interchangeably herein to refer broadly and inclusively to any type of display device or screen coupled to or integrated with a computing device for displaying content viewable by a user of the computing device. In an embodiment, the computing device is a mobile device. Such a display screen can include, for example and without limitation, a touch-screen liquid crystal display (LCD). In embodiments of the invention, a UI of a mobile device is viewed on a display.

Unless specifically stated differently, a user is interchangeably used herein to identify a human user, a software agent, or a group of users and/or software agents. Besides a human user who needs to view calendar data, a software application or agent sometimes needs to update, display and synchronize calendar data. Accordingly, unless specifically stated, the term "user" as used herein does not necessarily pertain to a human being.

As used herein, the term "height" is used in connection with a calendar view where the hours of the day are arranged in a vertical manner from top to bottom, but more generally, height refers to the space that is allotted to a given increment of time, e.g. an hour, in a calendar view. Similarly, the term "width" is used in connection with a calendar view where increments of time (i.e., hours of a day) are arranged in a horizontal manner from top to bottom. More generally, width refers to the display space that is allotted to a given increment of time, e.g. an hour, in a horizontal calendar view.

The detailed description of embodiments of the present invention is divided into several sections. The first section describes systems for efficiently fetching data from enterprise calendar applications on servers and displaying the fetched data on mobile client devices. Subsequent sections describe a user interface and methods for efficient displaying of calendar data on mobile client devices.

II. NON-LINEAR CALENDAR VIEW DISPLAY ARCHITECTURE AND SYSTEM

FIG. 1 is an illustration of an exemplary calendar system architecture 100 in which embodiments described herein can be implemented. The calendar system architecture 100 includes a client device 120 hosting a client calendar application 122. In the exemplary embodiment depicted in FIG. 1, the client calendar application 122 may be desktop client of a calendar application such as, but not limited to an iCal application capable of executing on a computing device running an OS X operating system from Apple Inc. or a MICROSOFT™ Outlook client capable of executing on a computing device running a MICROSOFT™ WINDOWS server or desktop OS. In other embodiments depicted in FIG. 1, a mobile calendar application 162 may be a version of iCal, Outlook or Google calendar applications optimized and/or tailored to execute on mobile devices 160 running mobile operating systems (OSs) such as, but not limited to, the iOS from Apple Inc. and the Android OS from Google Inc. Although a single mobile device 160 and a single client device 120 are depicted in the calendar system architecture 100, it is understood that a plurality of mobile devices 160 can access, update, and synchronize events 169 and data in a mobile calendar data store 166 with one or more client devices 120. For example, events 169 and data stored in the mobile calendar data store 166 can be shared in some part with one or more local calendar data stores 126 and client events 129 residing on one or more client devices 120. As shown in FIG. 1, this synchronization and sharing can be accomplished via communications sent over a wireless network 132.

The mobile device 160 can be any type of mobile computing device having one or more processors, an input device (for example, a touch-screen, QWERTY keyboard, microphone, a track pad, a scroll wheel, audio command, a track ball, or a T9 keyboard), and a communications infrastructure capable of receiving and transmitting data over a network. For example, the mobile device 160 can include, but is not limited to, a personal digital assistant (PDA), an iPhone™, an iPod™ touch, or iPad™ tablet device, a device operating the Android operating system (OS) from Google Inc., device running the MICROSOFT™ WINDOWS® Mobile Standard OS, a device running the MICROSOFT™ WINDOWS® Mobile Professional OS, a device running the Symbian OS, a device running the PALM OS®, a mobile phone, a BLACKBERRY® device, a smart phone, a hand held computer, a netbook computer, a palmtop computer, a laptop computer, an ultra-mobile PC, or another similar type of mobile device capable of processing instructions and receiving and transmitting data to and from humans and other computing devices.

As illustrated in FIG. 1, the mobile device 160 may comprise a mobile calendar application 162 and a mobile calendar data store 166 residing locally on the mobile device 160.

Figure 2:
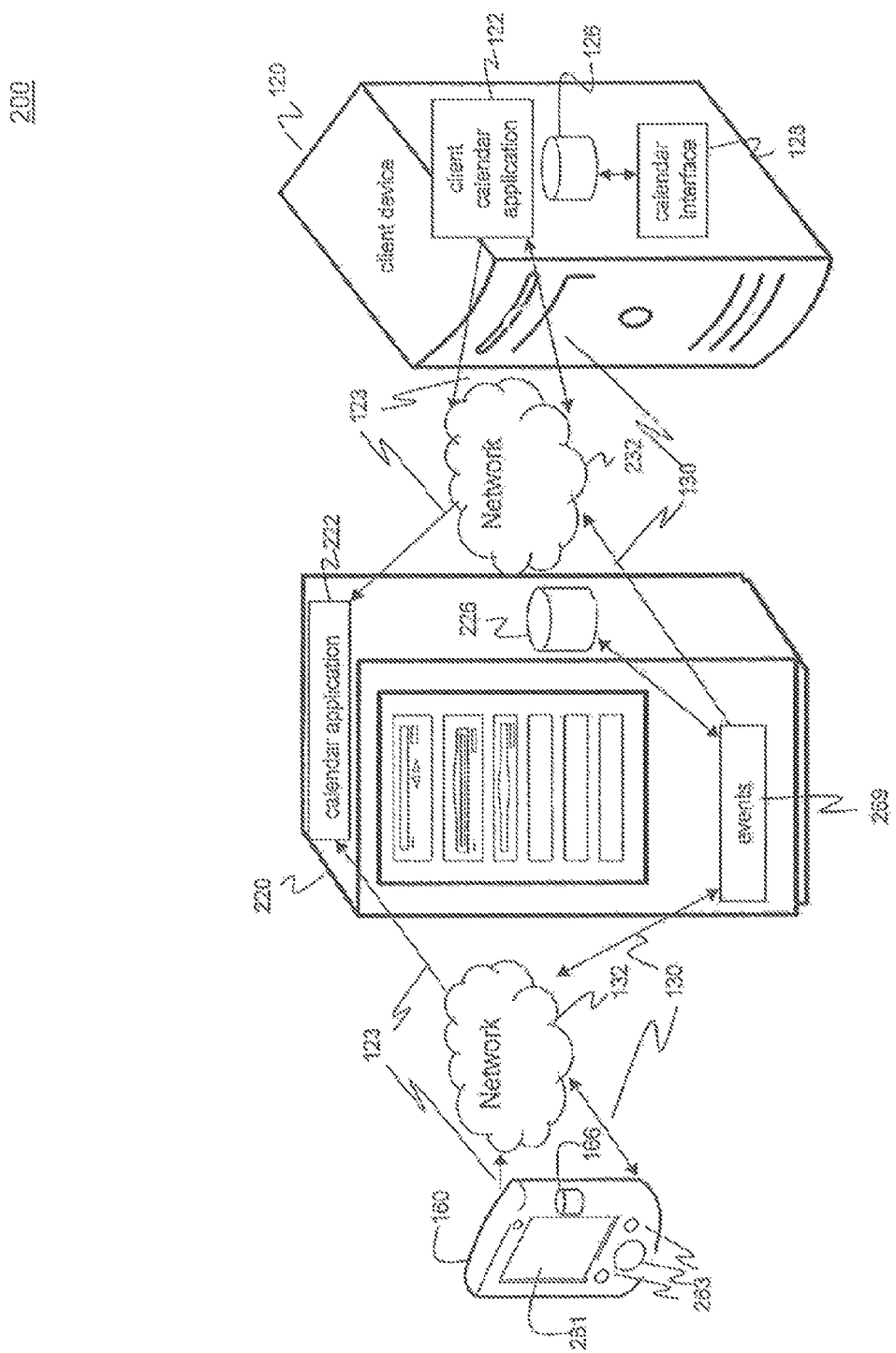
FIG. 2 illustrates a modular view of a system for non-linear display of calendar entries on client devices, in accordance with an embodiment of the present invention.

FIG. 2 depicts a non-linear calendar display system 200 in which a mobile device 160 and a client device 120 are capable of fetching and displaying calendar data from a calendar application server 220 via networks 132 and 232, respectively. The calendar application server 220 may be an enterprise server used by an organization, such as, but not limited to, a business, a university, a governmental organization, or a non-profit organization, to host an enterprise calendar database 226 with calendar and event data shared amongst members of the organization. FIG. 2 is described with continued reference to the embodiment illustrated in FIG. 1. However, FIG. 2 is not limited to that example embodiment.

The non-linear calendar display system 200 can be configured to synchronize calendar data and events between and among a plurality of client devices 120, mobile devices 160 and a client application server through communications sent via networks 132 and 232. The calendar application server 220 can be any type of server or computing device capable of serving data from an enterprise calendar database 226 to one or more client devices 120 and mobile devices 160. For example, the calendar application server 220 can include, but is not limited to, a computer or a cluster of computers that may be a part of a server farm.

The wireless network 132 can be any network or combination of networks that can carry data communication. Such networks can include, but are not limited to, a Wi-Fi, 3G, and a 4G/LTE network. In addition, the network 232 shown in FIG. 2 can include, but is not limited to a wired Ethernet network, a local area network (LAN), a medium area network, and/or a wide area network (WAN) such as the Internet. The wireless network 132 and the network 232 can support protocols and technology including, but not limited to, Internet or World Wide Web protocols and/or services. Intermediate network routers, gateways, or servers (not shown) may be provided between components of the architecture 100 and the system 200 depending upon a particular application or environment.

In an embodiment, the calendar application server 220 includes an enterprise calendar database 226. The enterprise calendar database 226 may store any type of calendar data, including, but not limited to, events 269 and calendar input 123 such as the calendar preferences shown in FIG. 1. Such calendar data is disseminated as event data and calendar view settings 130 to be used by a mobile calendar application 162 and a client calendar application 122, hosted on the mobile device 160 and the client device 120, respectively. Although the enterprise calendar database 226 is shown as a component of the application server 220, the enterprise calendar database 226 may be communicatively coupled to the calendar application server 220 via an indirect connection over a local, medium area, or wide area network. In addition, although only one enterprise calendar database 226 is shown, additional databases may be used as necessary (i.e., to support multiple types of calendar applications hosted on one ore more application servers 220).

Traditionally, server and enterprise calendar applications, such as server calendar application 222 and client calendar application 122 are installed as 'native' or platform-dependent applications on dedicated backend or enterprise servers such as the calendar application server 220 and desktop or laptop computers such as the client device 120. Despite the usefulness of these applications, it has been difficult to implement quick access to large amounts of data in the enterprise calendar database 226 from mobile devices 160. This problem is compounded when a large amount of data from the enterprise calendar database 226, such as a response to a calendar input 123 for a large range of dates, must be communicated via the wireless network 132. Even when a relatively low number of records are to be fetched from the enterprise calendar database 226 in response to a calendar input 123, the amount of data needed to return event data and calendar view settings 130 can be large enough to encounter mobile retrieval and display delays. Without a responsive mobile UI for viewing events 169, users of mobile devices 160 may find it preferable to access events 269 directly via the calendar application server 220 in order to be able to more quickly view calendar data. For example, calendar UI responses that take more than 150 milliseconds are likely to be perceived an unresponsive by users. Additionally, creating a calendar interface to view data from the enterprise calendar database 226 residing on calendar application servers 220 has traditionally involved developing dedicated software for a mobile device platform, or including a native calendar application as part of a mobile device platform or operating system (OS). However, even native calendar applications are often unable to efficiently handle calendar data spanning large durations without hiding or minimizing non-core time increments, such as late evenings, early mornings, and weekends. By implementing a non-linear calendar view, system 200 enables efficient fetching of data from the mobile calendar data store 166 on the mobile device 160 and increases the ease and speed with events 169 can be viewed in a UI of the mobile device 160. Another advantage of embodiments disclosed herein is that mobile devices 160 lacking sufficient processing and storage resources to handle large data sets can be used to view and navigate a subset of events 269 residing on calendar application servers 220.

In the exemplary calendar system architecture 100 and system 200 depicted in FIGS. 1 and 2, the mobile calendar data store 166 and the client calendar data store 126 include respective subsets of the enterprise calendar database 226, which have been returned in response to calendar input 123 received from either a mobile calendar application 168 or a client calendar application 128. In response to calendar inputs 123, calendar application server 220 returns event data and calendar view settings 130 to the requesting mobile device 160 or client device 120. The calendar interface 168 then displays a subset of the enterprise calendar database 22 corresponding to the date/time range selected by a user of mobile calendar application 162, as requested in calendar input 123. According to an embodiment, events 169 are received at the mobile device 160, via network 132, and stored in a local calendar data store 166 so that they can be displayed within a calendar interface 168 on the mobile device 160. As shown in the example embodiment of FIG. 1, calendar interface 168 comprises commonly-used time increments 167 and other time increments 165. The components and functionality of calendar interface 168 are described below in the context of the exemplary user interfaces depicted in FIGS. 3-10.

As used herein, in an embodiment, a non-linear calendar view is implemented using a logical data structure that stores calendar data, preferences and view settings needed to graphically depict a non-linear calendar view for a given duration. For example, designated commonly-used time increments 167 in a non-linear calendar view display are rows or columns to be allotted equal space in a display of a graphical user interface (GUI), wherein other time increments 165 are allotted less space relative to the commonly-used time increments 167. As used herein, a non-linear calendar view facilitates presentation of a navigable rendering of calendar time increments for a duration having more increments of time than can be simultaneously and legibly displayed within a calendar interface 168. The data records in a non-linear calendar view include both linearly-displayed commonly-used time increments and compress, non-linearly-displayed other time increments 165. According to an embodiment, the GUI screen is rendered on a display 261 of a mobile device 160. In embodiments, a non-linear calendar view enables calendar navigation through using calendar inputs 123, such as commonly-used hour designations and calendar preferences to ensure that a combination of navigation commands such as scroll commands, touch screen slide/scroll gestures to display all time increments for a navigated-to duration.

The calendar display architecture 100 and the system 200 are operable to fetch events 169 and calendar data 166 needed to display commonly-used time increments 167 within calendar interface 168 on the mobile device 160. Client calendar applications 162 and 122 executing on mobile devices 160 and client devices 120 with touch-sensitive displays can detect slide gestures and measure the speed of the gestures. In an embodiment, the speed is measured in pixels per second (pps) relative to pixels of display 261 traversed in a second of scrolling. When client calendar applications 162 and 122 know how fast a prior slide gesture was, they can determine how much and at what speed, in pps, a screen will scroll when a subsequent slide gesture of the same speed occurs. The mobile calendar applications 162 and the client calendar applications 122 also determine the height or width of a single commonly-used time increment 167 in pixels. By determining this height or width, mobile calendar applications 162 and client calendar applications 122 know how many commonly-used time increments 167 are scrolled over or navigated past for a given scroll speed (in pps).

In embodiments, rows of other time increments 165 farthest from commonly-used time increments 167 or a commonly-used time increment 167 centered within a calendar view on the display 261 are allotted progressively less display space in the calendar view based on their respective distance from either any commonly-used time increment 167 or the particular commonly-used time increment 167 displayed in the center of the current calendar view (i.e., Noon in the example of FIGS. 5-10). Similarly, any events 169 scheduled within those other time increments 165 are likewise allotted progressively less display space in the calendar view based on their respective distance from either any commonly-used time increment 167 or a particular commonly-used time increment 167 centered in the current calendar view (e.g., 12 Noon).

According to embodiments of the invention, the mobile calendar application 162 and the client calendar application 122 comprise respective modules configured to initialize calendar interfaces 168 and 128, respectively, by allotting equal display space to each commonly-used time increments 167 (i.e., linear display) and allot progressively less display space to other time increments 165 and 125, respectively, based on their relative distance in time or pixels from a commonly-used time increment 167 or 127 (i.e., non-linear display).

Respective modules of the mobile calendar application 162 and the client calendar application 122 also display events 169 and 129, respectively, occurring within commonly-used time increments 167 and 127 and other time increments 165 and 125 by allotting display space for the events based upon whether they occur wholly within commonly-used time increments or wholly within other time increments. In cases where an event 169 or 129 spans across commonly-used time increments and other time increments, the portions of the event occurring within commonly-used time increments are displayed linearly and portions occurring within other time increments are displayed non-linearly in calendar interfaces 168 and 128, respectively. For example, on the mobile device 160, if an event 169 spans across commonly-used time increments 167 and other time increments 165, the portions of the event 169 occurring within commonly-used time increments 167 are displayed linearly and portions occurring within other time increments 165 are displayed non-linearly in the calendar interface 168 of the mobile calendar application 162.

The modules facilitate function calls to carry out the above-noted functionality. The modules facilitate function calls to carry out the above-noted functionality. In embodiments, the modules can be written in HTML and/or JavaScript to invoke and cascading style sheets (CSS) to implement a non-linear calendar view rendered by a browser on a mobile device 160 or a client device 120. As would be appreciated by one of skill in the relevant arts, other programming languages and technologies can be used to implement the functionality.

In an embodiment, the calendar application 222 hosted on the enterprise calendar server 220 is configured to receive a calendar input and preferences 123 from mobile calendar application 162 via network 132. In embodiments, calendar input and preferences 123 may comprise calendar view navigation gestures and inputs in a calendar view interface 168 displayed on display 261 depicted in FIG. 2. A user, using input device 263 of FIG. 2, can select one or more of searches, queries, or calendar view navigation inputs on mobile device 160. These queries/inputs 123 are then forwarded to the calendar application server 220 via network 132.

According to an embodiment, the client calendar application 122 is further configured to identify a subset of data in enterprise calendar database 226 event data and calendar view settings 130 to be stored in a local calendar data store 126 on the client device 120. Event data and calendar view settings 130 corresponds to the received calendar input and preferences 123. In this embodiment, the server calendar application 222 interacts with the enterprise calendar database 226 to retrieve event data and calendar view settings 130 corresponding to calendar input and preferences 123. The calendar data 126 is received at mobile device 160 via network 132. At this point, calendar data 126 populate a calendar interface 168 on mobile device 160. Calendar interface 168 is a virtual data window comprising commonly-used time increments 167, which are a subset of the calendar data 126 displayed on display 261 of mobile device 160.

According to an embodiment, the calendar application server 220 may be one or more computers. For example, the calendar application server 220 may run on a cluster of computing devices operating in a cluster or server farm. In another embodiment, the calendar application server 220 may be a virtual machine running on a backend server (not shown).

As depicted in FIG. 2, the mobile device 160 may further comprise a display 261 and an input device 263. Input device 263 can be used by a user of mobile device 160 to initiate event searches (queries) and other calendar inputs 123 to navigate within the calendar interface 168. Additionally, calendar data that has previously been received at the mobile device 160 and stored in calendar data store 126, such as events 169 corresponding commonly-used time increments 167 and other time increments 165 can be displayed on display 261.

Although the enterprise calendar database 226 is depicted in FIGS. 1 and 2 as being hosted locally on the calendar application server 220, it is understood that the enterprise calendar database 226 can be a remote database hosted on a separate database server (not shown) that is accessible by the calendar application server 220.

In accordance with an embodiment, data stored in the enterprise calendar database 226 hosted by the calendar application server 220 may also be synchronized with local calendar data stores 126 and 166 residing on one or more client devices 120 and mobile devices 160, respectively. "Calendar data" as used herein may be any calendar object, including, but not limited to, event data (optional and required meeting/call participants, organizer(s), location/dial-in number, start time, stop time, and alerts/reminders) and calendar information in any form (text, images, video, audio, etc.) displayable in the display 261 of the mobile device 160 or a display (not shown) of the client device 120.

Architecture 100 and system 200 are commonly implemented within a persistent network connection over a mobile/cellular provider network, and communications of calendar input 123, calendar data 126, and related communications may travel over the Internet. However, mobile device 160 may connect to the calendar application server 220 by any communication means by which the calendar application server 220, the client device 120, and the mobile device 160 may interact, such as a docking cradle, Wide Area Network (WAN), Local Area Network (LAN), Wireless Local Area Network (WLAN), infrared, Bluetooth or another wireless network 132.

In a typical mobile environment, multiple mobile devices 160 send calendar input 123 to one or more application servers 220 via one or more wireless networks 132.

As shown in FIG. 2, the non-linear calendar display system 200 can also be implemented in mixed mobile and wired environments. For example, a calendar interface 128 with features similar to the calendar interface 168 rendered by a mobile calendar application 162 running on a mobile device 160 can be implemented as part of a client calendar application 122 running on a personal computer, such as the client device 120. The calendar application server 220 and the client device 120 need not be a single physical computer, and may in fact comprise several computers distributed over a number of physical and network locations. For the purposes of illustration, the mobile device 160, the calendar application server 220, and the client device 120 are depicted as single points of access in calendar system architecture 100 and non-linear calendar display system 200. The calendar application server 220 and the client device 120 need not be separate physical computers either, and may in fact comprise a single computer as the functionality of the client device 120 may be performed by a virtual machine running on the calendar application server 220. Conversely, the functionality of the calendar application server 220 may be performed by a virtual machine executing on the client device 120.

In accordance with an embodiment of the present invention, the calendar application server 220 facilitates fetching of data from the enterprise calendar database 226 by processing calendar input 123 from the mobile device 160 and calendar input 123 from the client device 120. In the example embodiment depicted in FIG. 2, the client device 120 is a personal computer hosting client calendar application 162 and calendar data store 126. Client calendar application 122 may send queries/calendar preferences 123 to the calendar application 222 via network 232. In response, the calendar application server 220 can return event data 269 used to populate a calendar data store 126 on the client device 120. In this way, the system for non-linear calendar architecture 100 described above with reference to FIG. 1 can be implemented for other types of client devices, in addition to the mobile device 160 embodiments described above. For example, the client device 120 can be a workstation, terminal, server, personal computer, or laptop computer connected to the calendar application server 220 via the network 232. The network 232 may be any one of the networks described above with reference to the wireless network 132. The network 232 can also be wired networks such as, but not limited to, wired LANs, WANs, Intranets, and Ethernet networks.

III. EXAMPLE USER INTERFACE FOR NON-LINEAR DISPLAY OF CALENDAR DATA

FIGS. 3-10 illustrate graphical user interfaces (GUIs), according to embodiments of the present disclosure. The GUIs depicted in FIGS. 3-10 are described with reference to the embodiments of FIGS. 1 and 2. However, the GUIs are not limited to those example embodiments. FIGS. 3-10 illustrate an exemplary calendar application interface displaying data from a client calendar application.

In an embodiment of the invention, the calendar interface 168 illustrated in FIGS. 3-10 is displayed on mobile device 160 having a touch sensitive (i.e., touch screen) display 261. For ease of explanation, the operation of the calendar interface 168 is discussed in the context of a mobile device platform with a touch-screen, but is not intended to be limited thereto. Examples of such mobile device platforms include, but are not limited to, the iOS from Apple, Inc.; the WINDOWS® Mobile OS from the MICROSOFT™ Corporation; Android from Google Inc.; and the Blackberry OS from Research In Motion ("RIM"). For example, the mobile device 160 of FIGS. 1 and 2 may be used to implement the mobile device in this example.

It is to be understood that the calendar interface 168 illustrated in the exemplary embodiments of FIGS. 3-10 can be readily adapted to execute on a display of mobile device platforms and operating systems, a computer terminal, a display of the client device 120, a display console of the calendar application server 220, or other display of a computing device. Thus, the exemplary GUIs illustrated in FIGS. 3-10 can be rendered on the display 261 of a mobile device 160 using a mobile calendar application 162, on a display console of calendar application server 220, or on a display of a client device 120 by client calendar application 122.

Throughout FIGS. 3-10, displays are shown with various icons, command regions, interfaces, windows, tiles, and buttons that are used to initiate action, invoke routines, view calendar data, scroll through calendar views, or invoke other functionality. The initiated actions include, but are not limited to, viewing events, editing events, inputting calendar preferences, a backward scroll, a forward scroll, and other calendar view navigation inputs and gestures. For brevity, only the differences occurring within the figures, as compared to previous or subsequent ones of the figures, are described below.

Figure 15:
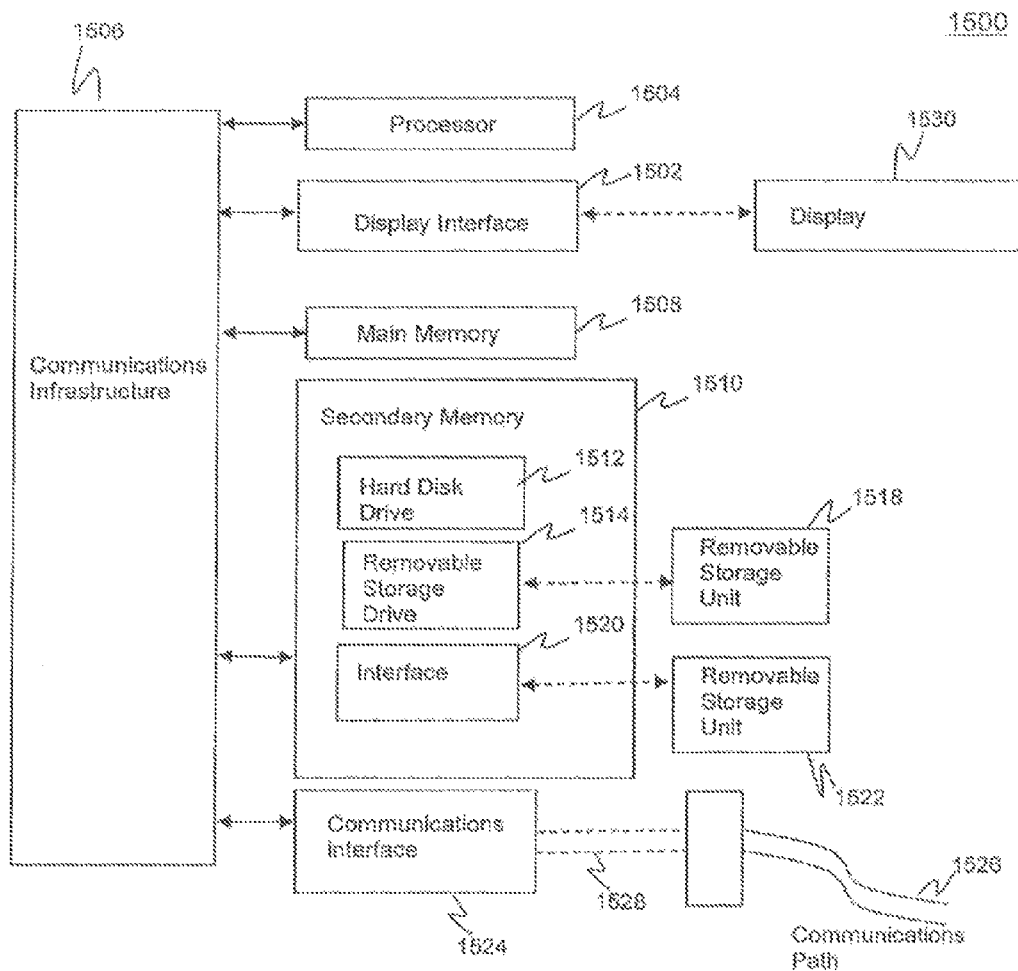
FIG. 15 depicts an example computer system in which embodiments of the present invention may be implemented.

In an embodiment, the display 261 used to display the calendar interface 168 shown in FIGS. 3-10 may be a computer display 1530 shown in FIG. 15, and the calendar interface 168 may be display interface 1502. According to embodiments of the present invention, a user can interact with the calendar interface using input devices 263 such as, but not limited to, a touch screen, a pointing device, a stylus, a track ball, a touch pad, a mouse, a keyboard, a keypad, a joy stick, a voice activated control system, or other input devices 263 used to provide interaction between a user and calendar interface 168. As described below with reference to FIGS. 3-10, such interaction can be used to indicate calendar input 123 and navigate through the corresponding event data that is presented in accordance with the calendar view settings 130 received in response to the calendar input 123.

Figure 3A:
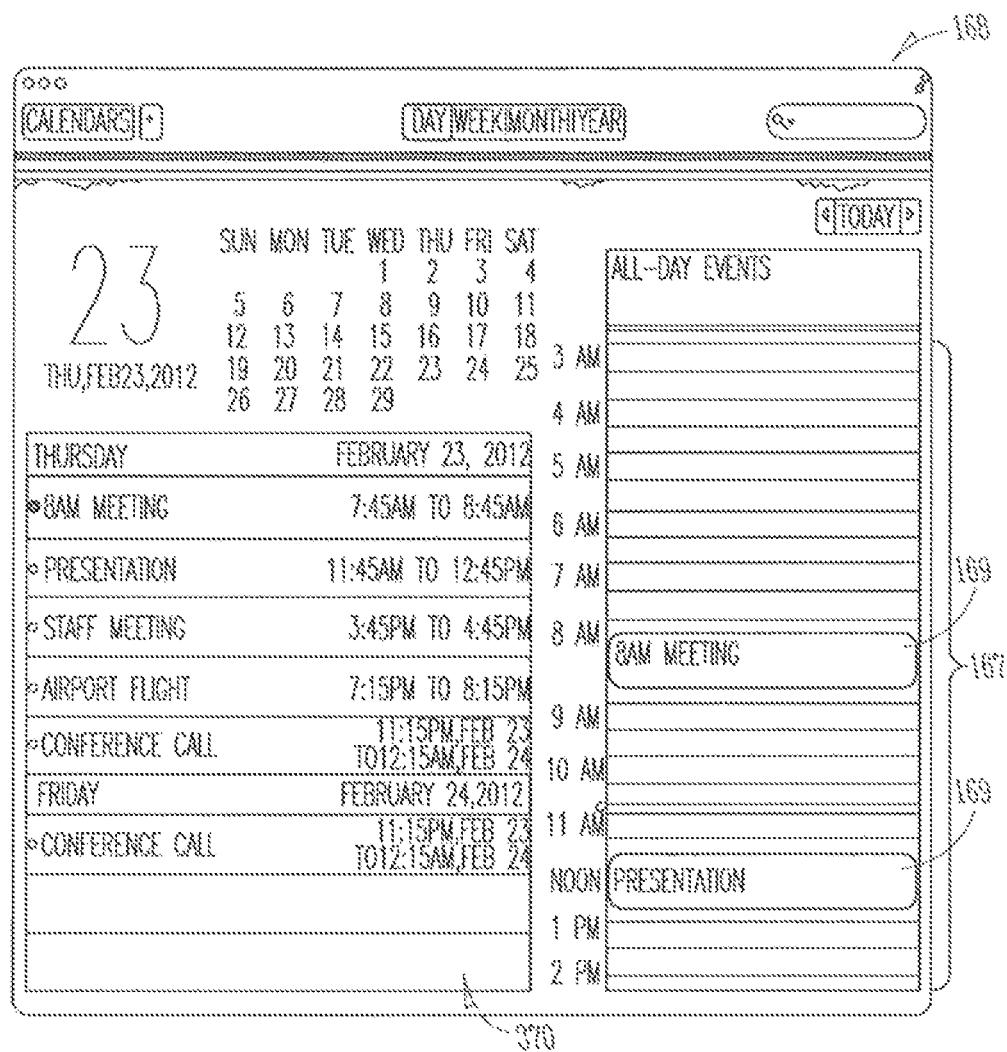
Figure 3B:
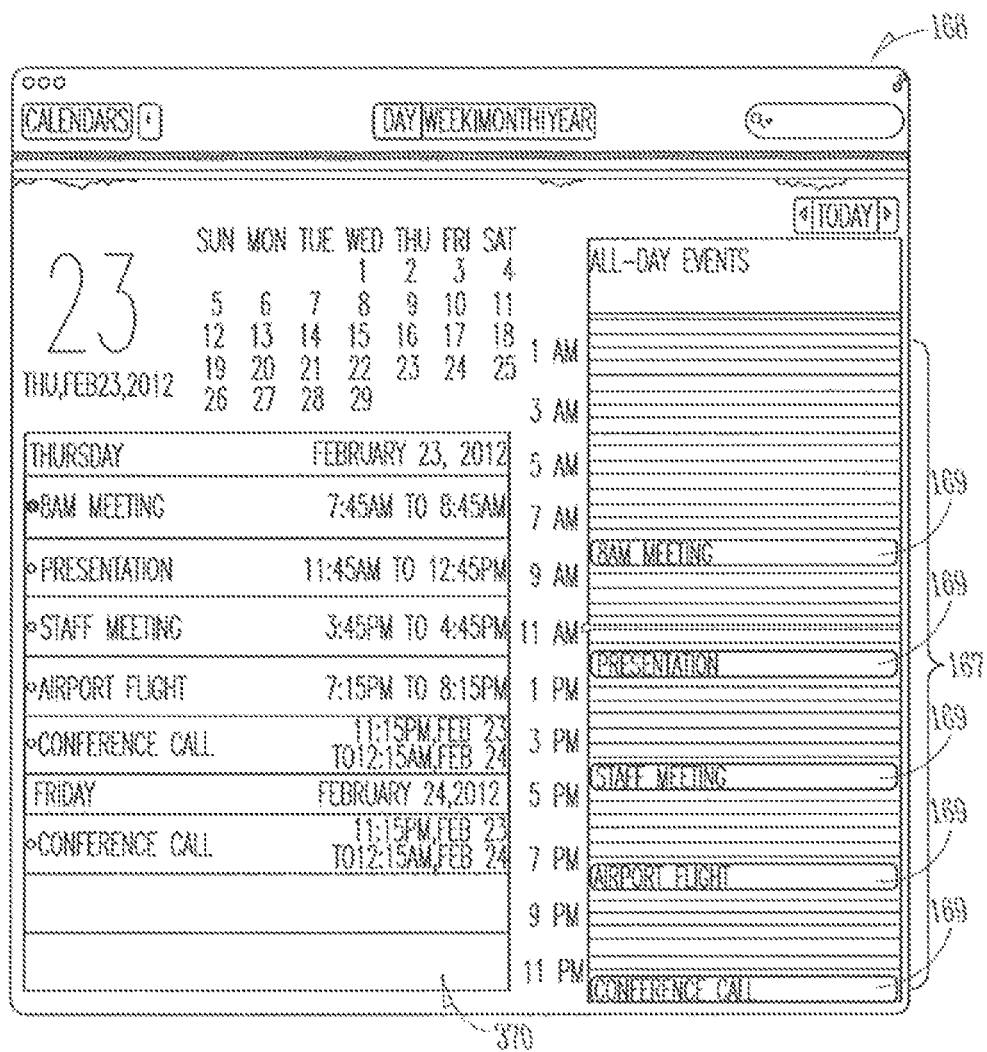

FIGS. 3A and 3B depict an exemplary GUI within the calendar interface 168 for viewing events 169. As shown in FIGS. 3A and 3B, an event summary window 370 can be used to present at least a portion of event data 130 for one or more events 169 that are scheduled for a given duration. In the examples shown in FIGS. 3A and 3B, the event summary window 370 presents summaries for all events 169 occurring in a given 24-hour day, with the event names, start times and stop times. As shown in FIGS. 3A and 3B, any event scheduled to span a given duration (i.e., beginning in the current day and concluding the following day), is also displayed in the event summary window 370.

With reference to FIG. 3A, the events 169 summarized in the event summary window 370 are also displayed in their corresponding commonly-used time increments 167. As shown in FIG. 3B, a user, using a touch screen (i.e., the display 261) or an input device 263, can scroll forward through the commonly-used time increments 167 to view events 169 scheduled during the entire duration summarized in the event summary window 370. In the example of FIGS. 3A and 3B, scrolling forward through the commonly-used time increments 167 allows a user to navigate within the calendar interface 168 to see events 169 for an entire 24 hour day, including an event 169 (i.e., a conference call appointment) that begins in the current day and is schedule to end the following day. As depicted in FIGS. 3A and 3B, each commonly-used time increment 167 for the displayed duration (i.e., each hour of the day) is allotted an equal amount of display space in the calendar view. In other words, the commonly-used time increments 167 are displayed in a linear fashion within the calendar interface 168. Similarly, each of the events 169 scheduled during the commonly-used time increments 167 (see events 169A in FIGS. 5-10) is allotted display space in a direct, linear proportion to their respective durations, which are determined based upon the respective start and stop times.

Figure 4A:
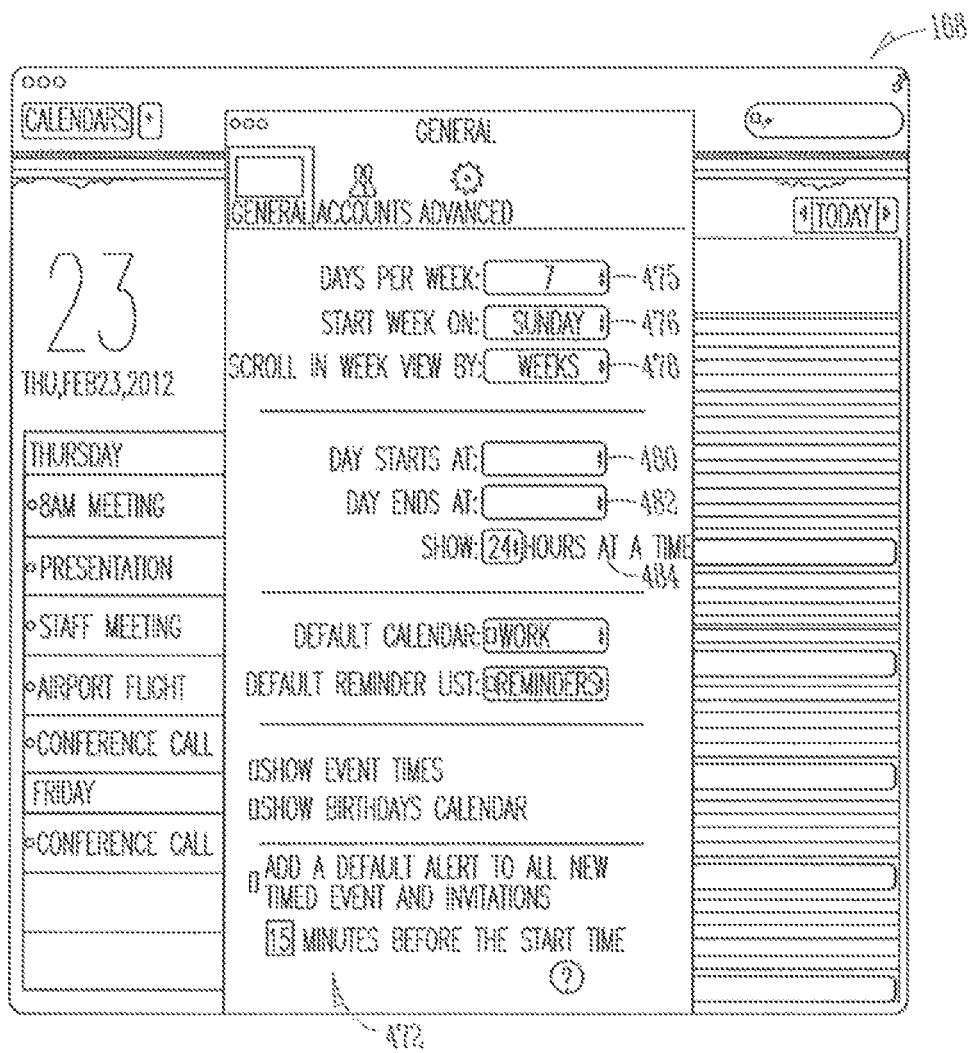

FIG. 4A depicts an exemplary interface for selecting calendar preferences 123, such as commonly-used increments of time 167. As shown in FIG. 4A, in an embodiment, the calendar interface 168 can include a general preferences interface 472 enabling a user to make calendar inputs and set calendar preferences 123, including the number of days per week to display 475, the starting day of a week 476, and a navigation/scroll preference 478 for a calendar view.

With continued reference to FIG. 4A, the general preferences interface 472 also enables a user to select and change commonly-used increments of time by selecting a starting time 480 and an ending time 482 for a duration (i.e., a starting and ending hour for a day). For example, in an embodiment, calendar interface 168 can be used in conjunction with the components of architecture 100 and system 200 described above to view commonly-used time increments 167 of 8 AM-6 PM linearly in response to receiving an indication, via the general preferences interface 472, that a user's work day starts at 8 AM and ends at 6 PM. FIGS. 3A, 3B, 4A and 4B represent exemplary calendars view before commonly-used hours have been designated (i.e., by using the general preferences interface 472) and as such, each increment of time in these FIGs is shown as having the same display size (i.e., all increments of time are treated as commonly-used increments of time 167 unless designated otherwise).

Lastly, the general preferences interface 472 enables a user to indicate a number of time increments 482 to display within the calendar interface 168 for a given duration (i.e., display 24 hours of a day).

Figure 4B:
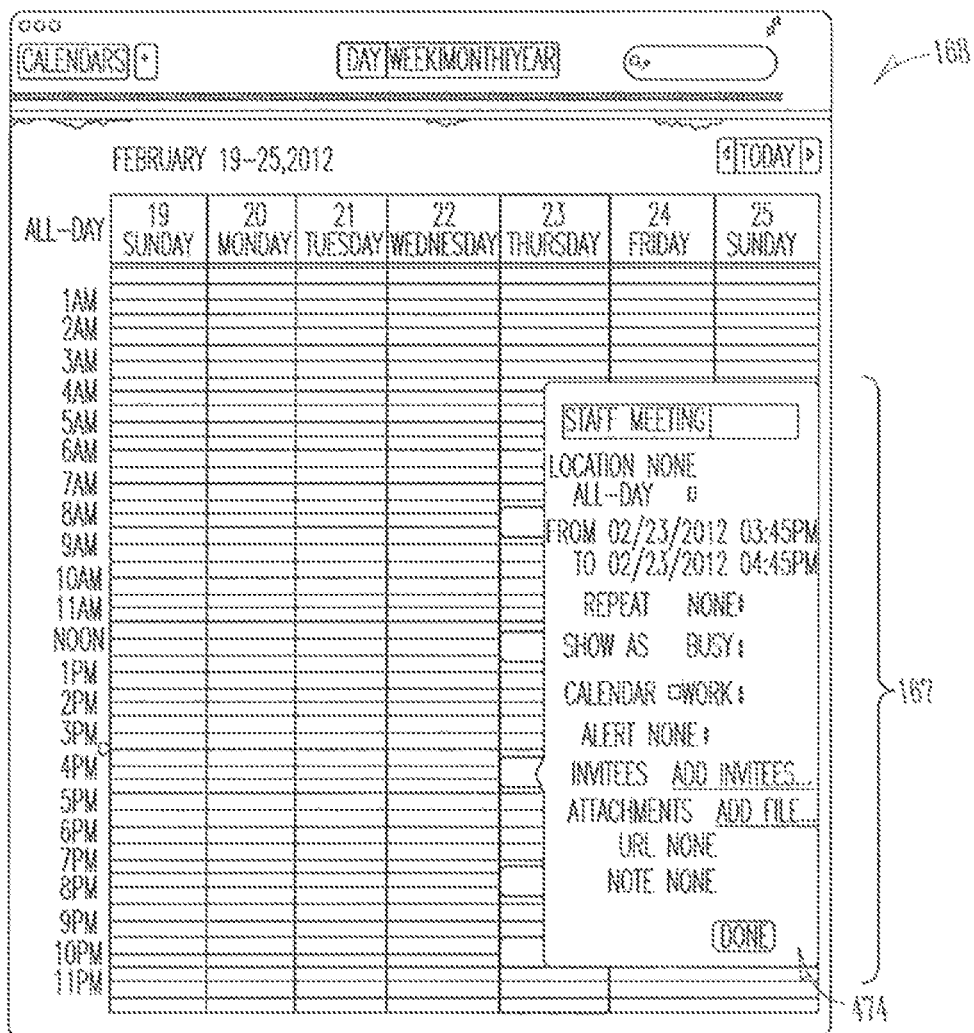

FIG. 4B depicts an event editing interface 474 that can be used to create and edit an event 169. The exemplary event editing interface 474 provided in FIG. 4B illustrates how a user, using an input device 263 or a touch-sensitive display 261 can enter and edit event data 130 including, but not limited to, the event name, location, start/stop times, alerts/reminders, invitees, attachments, a related universal resource locator (URL), and any notes regarding the event 169.

FIGS. 5-10 illustrate embodiments of calendar views within the calendar interface 168 that efficiently display both commonly-used and other increments of time for a given duration. In particular, FIGS. 5-10 depict how the commonly-used increments of time 167 indicated in the general preferences interface 472 of FIG. 4A are allotted equal, linearly arrayed amounts of display space while other time increments 165 are allotted less space as compared to the commonly-used increments of time 167. In the exemplary embodiments illustrated in FIGS. 5-10 all increments of time for a given duration (i.e., 24 hours of a day) are displayed. However, it is to be understood that in alternative embodiments some designated subset of time increments, such as hours encompassing the commonly-used increments of time 167 and only a portion of the other increments of time 165 may be displayed. In an embodiment, the system 200 includes the calendar interface 168 provided in FIGS. 5-10 and also includes an input device, such as an input device 263 or a touch sensitive display 261, which is configured to allow a user to scroll and navigate to other portions of a calendar data store 126 or 166 besides the commonly-used time increments 167 and the other time increments 165 currently being displayed. For example, through moving a pointer or cursor in calendar interface 168, a user can scroll to view additional rows within the exemplary calendar interfaces 168 shown in FIGS. 5-8 and additional columns within the calendar interfaces 168 shown in FIGS. 9 and 10.

As shown in FIGS. 5-8, a vertically-oriented calendar view 168 comprises equally-sized rows displayed along a vertical Y-axis for each commonly-used time increment 167 and relatively smaller, compressed rows for other time increments 165, according to embodiments. In the exemplary embodiments depicted in FIGS. 5-8, each commonly-used time increment 167 is allotted the same height, in pixels, within the calendar interface 168.

FIG. 5 depicts an exemplary embodiment wherein the time increment labels for the commonly-used increments 167 are larger (i.e., have a larger font size) than time labels for the other time increments 165. As shown in FIG. 5, based on the commonly-used increments of time 167 selected in the general preferences interface 472, the commonly-used increments of time 167 are displayed with equal display sizes (equal row heights) in the calendar view. As illustrated in FIG. 5, in this embodiment, as the allotted display sizes (i.e., heights in pixels) become progressively smaller for the other time increments 165 as they are farther in time or pixels from a commonly-used time increment 167, the font sizes for the corresponding time labels of the other time increments 165 also become smaller. In one embodiment, there is a non-linear, proportional decrease in size for the other time increments 165 and their corresponding labels (i.e., hours of the day in the example of FIG. 5) based upon how far (i.e., in hours or pixels) a particular other time increment 165 is from a commonly-used time increment 167. In another embodiment, the respective sizes of the other time increments 165 and their corresponding labels decrease in a progressive, non-linear fashion based on how far they are from the center of a calendar view (i.e., Noon in the example of FIG. 5). These embodiments are further explained below with reference to FIG. 14. In yet another embodiment (shown in FIG. 13), each other time increment 165 is allotted an equal, but reduced amount of display space in the calendar view. According to this embodiment, each of the other time increments 165 are equally compressed and given less display space than the commonly-used time increments 167, but maintain the same, compressed size no matter how far in time they are from a commonly-used time increment 167 or the center of a calendar view. This embodiment is further explained below with reference to FIG. 13.

With continued reference to FIG. 5, the events 169A occurring during the commonly-used time increments 167 are displayed in a linear fashion. For example, the event 169 scheduled from 1-3:30 PM is scheduled within commonly-used time increments 167, so each of its respective time increments are linearly displayed. In contrast, the event 169 scheduled from 2-4:30 AM occurs during other time increments 165, so even though it has the same duration (e.g., two and a half hours) as the event 169A from 1-3:30 PM, the 'off hours' event 169 is allotted less display space as compared to the event 169 occurring during the commonly-used time increments 167.

As also shown in FIG. 5, portions of the events 169 that span commonly-used time increments 167 and other time increments 165 are allotted display space based upon their scheduled start and stop times. For example, the early morning portions of the event 169 starting at 6 AM and ending at 12:30 PM are compressed and the portions falling during commonly-used time increments 167 are allotted more display space. Similarly, the portions of the event 169 scheduled to start at 9:30 AM and end at 8 PM that occur during commonly-used time increments 167 are displayed in a linear fashion and the off-hours portions occurring after 6 PM allotted progressively less space the farther in time (i.e., later in the evening) they are from 6 PM.

Lastly, the exemplary embodiment of FIG. 5 depicts how any events 169 scheduled far outside the commonly-used time increments 167, such as the events scheduled to start after 8 PM, are displayed as almost completely compressed in the calendar view, but still remain in view and are not completely hidden, minimized, or 'off the screen.'

Figure 6:
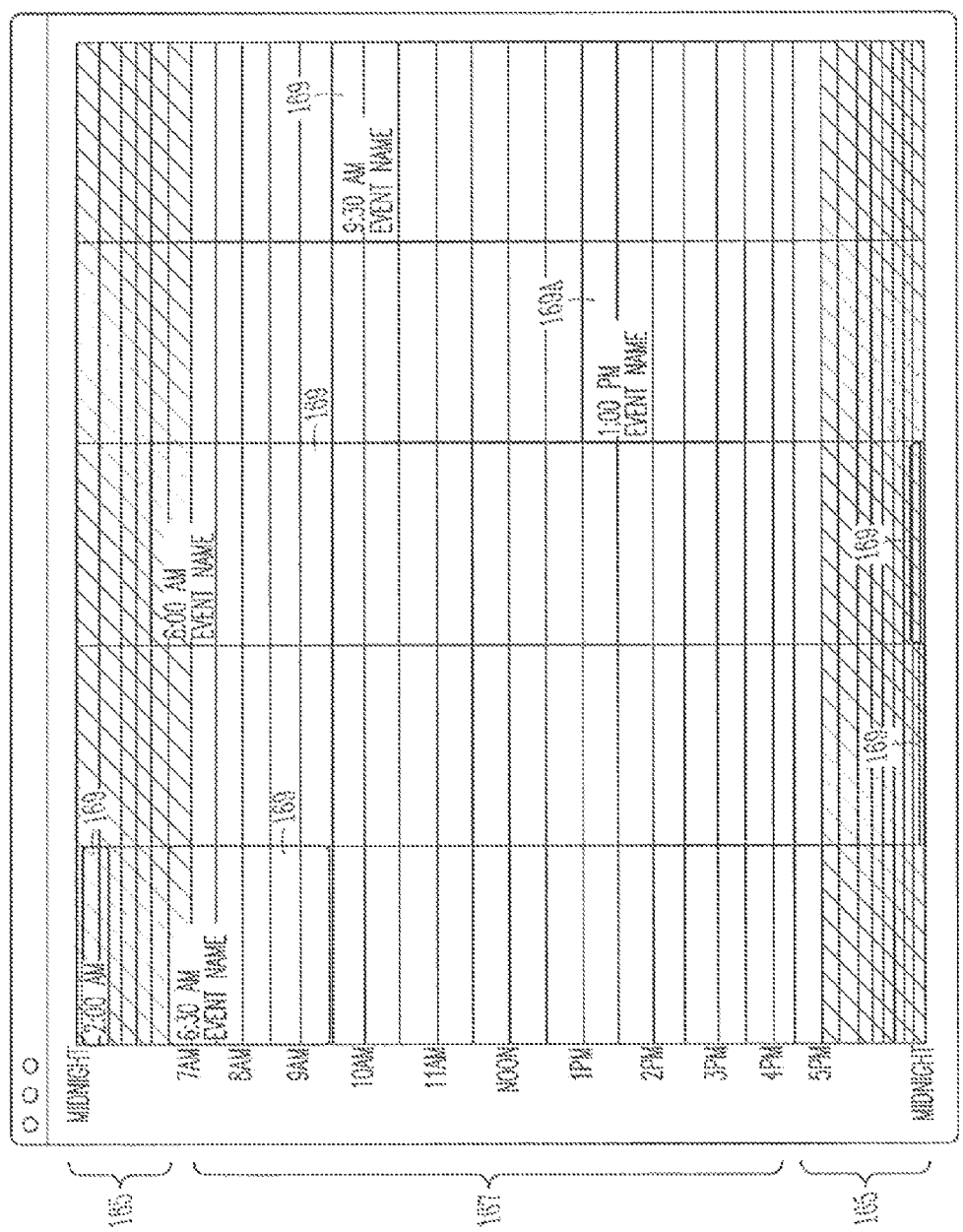

FIG. 6 depicts an alternative embodiment wherein the time increment labels for the other time increments 165 progressively 'fade out' (i.e., are displayed as being progressively grayed out) as they are farther in time or pixels from a commonly-used time increment 167. As illustrated in FIG. 6, in this embodiment, the allotted display sizes (i.e., heights in pixels) still become progressively smaller for the other time increments 165 as they are farther in time or pixels from a commonly-used time increment 167, but the corresponding time labels of the other time increments 165 also become fainter to emphasize their relative distance from a commonly-used time increment 167. In one embodiment, there is a non-linear, proportional decrease in size for the other time increments 165 and the faintness of their labels (i.e., hours of the day in the example of FIG. 6) based upon how far (i.e., in hours) a particular other time increment 165 is from a commonly-used time increment 167.

Figure 7:
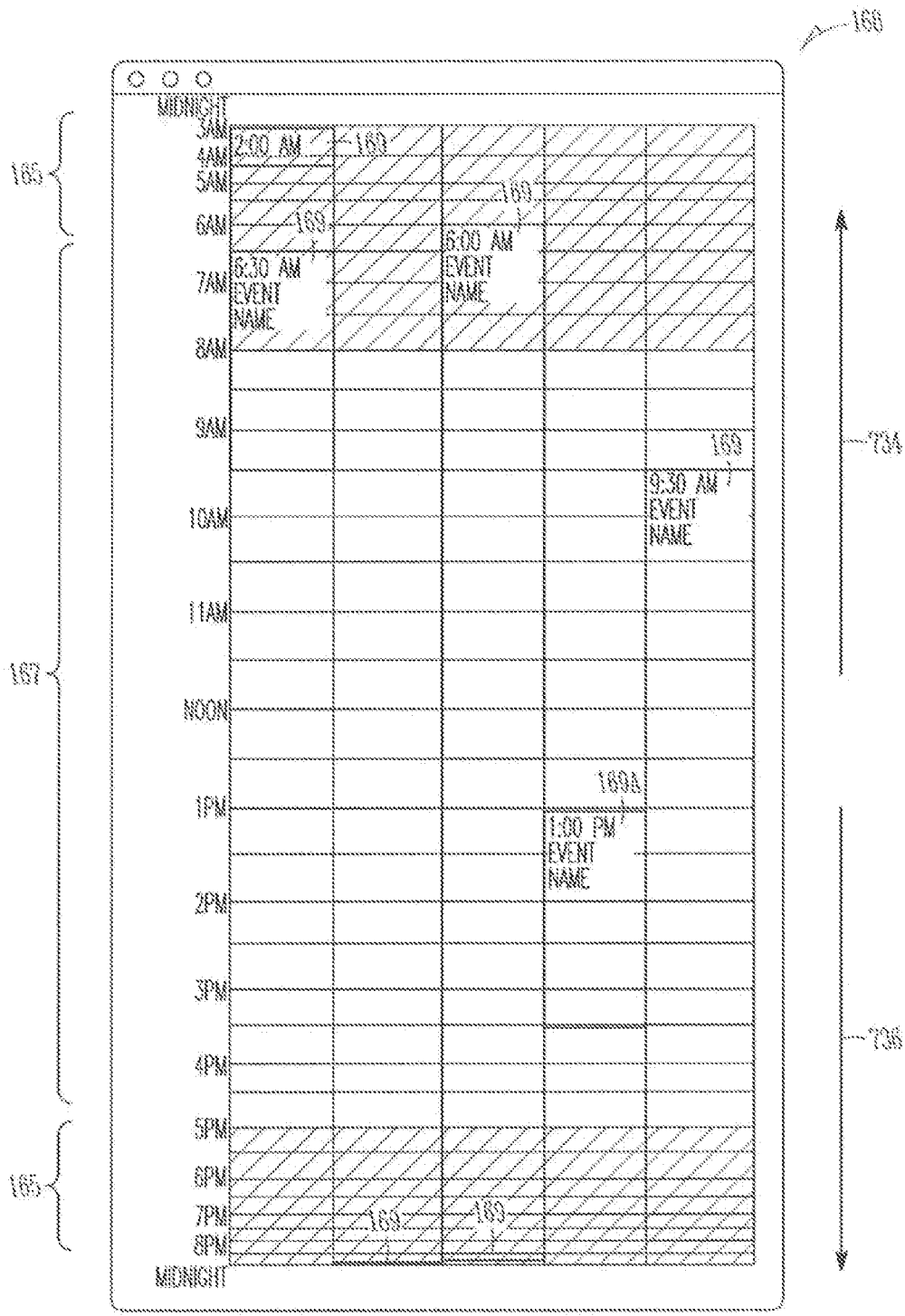
Figure 8:
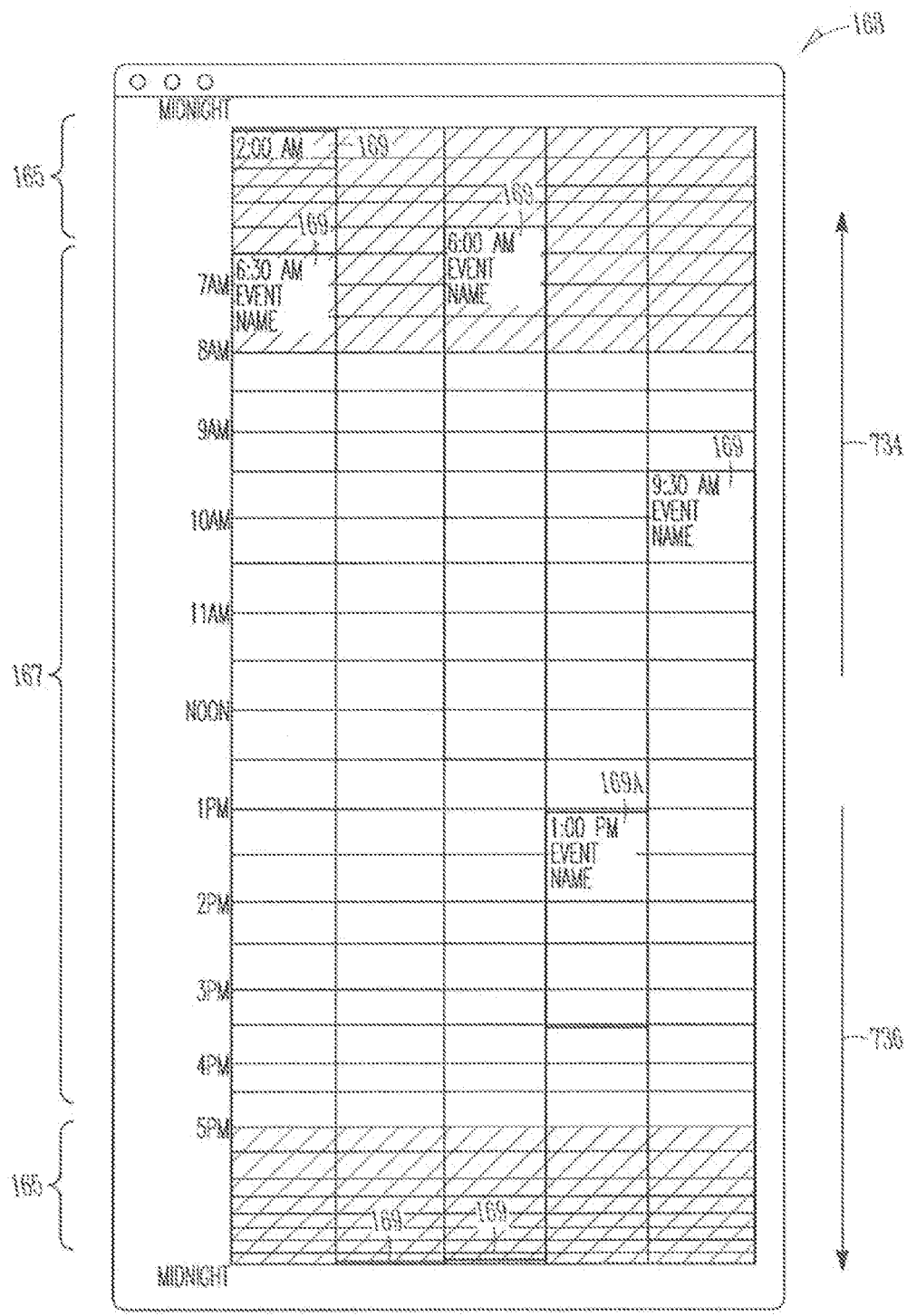

As shown in FIGS. 7 and 8, a user, via a gesture on a touch-sensitive display (i.e., a touch screen) or using an input device 263 can scroll back 734 or scroll ahead 736 to durations and time increments of calendar data beyond the duration currently-displayed in the calendar interface 168. For example a scroll back 734 input or gesture can scroll back in time in one-week increments corresponding to the navigation/scroll preference selected in general preferences interface 472. Scroll back 734 inputs and gestures are used to display previous durations (i.e., a previous day, week or month) including durations occurring in the past. Similarly, scroll forward 736 inputs or gestures can be used to display subsequent durations, including durations occurring in the future.

FIGS. 7 and 8 depict the optimization of other time increments 165 based upon scrolling and resizing gestures. FIGS. 7 and 8 are described with continued reference to the embodiments illustrated in FIGS. 1-6. However, FIGS. 7 and 8 are not limited to those embodiments.

As shown in FIGS. 7 and 8, a user, using an input device 263 or a touch-sensitive display 261, can scroll back 734 or scroll forward 736 through the calendar interface 168 and multiple durations (i.e., days, weeks or months), while still displaying the commonly-used time increments 167 for a currently-displayed duration. As discussed above with reference to FIG. 4A, the number of commonly-used time increments 167 can vary based on the number of increments 484 and on the form factor of the mobile device 160 in question or the design of the UI rows (i.e., the height or width, in pixels allotted to display the commonly-used increments 167). A user, using an input device, may scroll through a calendar interface 168 slowly, rapidly, or not at all. By using calendar interface 168, a user can quickly browse a few commonly-used time increments 167 without the entire enterprise calendar database 226 being stored locally in the data store 166 on the mobile device 160.

FIGS. 7 and 8 show how in an embodiment, the commonly-used time increments 167 for the calendar interface 168 can be rendered on a touch sensitive display 261. A direction of a slide gesture indicates which way time increments and durations will scroll. In the example shown in FIGS. 7 and 8 scroll back 734 and scroll forward 736 gestures can be detected along a Y-axis. In an embodiment, when a scroll forward 736 or scroll back 734 gesture results in an other increment of time 165 being centered in the calendar interface 168, that other increment of time 165 is 'magnified' by allotting it the same display size as a commonly-used increment of time 167. According to this embodiment, if a user of a mobile device 160 or client device 120 navigates outside of the commonly-used increments of time 167 and stops scrolling, selects, or hovers in proximity to an other increment of time 165, the display (i.e., display 261 in the case of a mobile device 260) renders the navigated-to other increment of time 165 in the 'normal' or full size allotted to a commonly-used increment of time 167. As would be understood by those skilled in the relevant art(s), the scrolling could be also along the X-axis to display commonly-used time increments 167 and other time increments 165 that are oriented or laid out horizontally, such as in FIGS. 9 and 10 discussed below.

An embodiment of the invention optimizes the display of other time increments 165 under the premise that a display 261 can present only a finite number of records at a time. In an embodiment, upon detecting that a user gestures or scrolls to view calendar data in the past (i.e., in response to a scroll back 734) or in the future (i.e., in response to a scroll forward 736), UI latency is avoided or minimized by dynamically allotting less display space to the other time increments 165 within a touch sensitive display 261.

In the embodiment shown in FIGS. 7 and 8, a calendar daily view is rendered with each of the commonly-used increments 167 being allotted equal heights (i.e., in pixels) in the calendar interface 168. As described above with reference to FIGS. 5 and 6, events 169A occurring wholly within commonly-used increments are displayed in a similar linear fashion. As shown in FIGS. 7 and 8, other increments 165 are allotted progressively smaller heights in pixels based on their relative distance, in time, from a commonly-used time increment 167. For example, the other increment 165 of 7-8 AM is allotted less space than the commonly-used increment of 8-9 AM, but more than 6-7 AM.

Like the embodiment shown in FIG. 5, FIG. 7 also depicts an exemplary embodiment wherein the time increment labels for commonly-used increments 167 are displayed as being larger (i.e., having a larger font size) than the time labels for the other time increments 165. As illustrated in FIG. 7, in this embodiment, as the display sizes (i.e., heights in pixels) become progressively smaller for the other time increments 165 as they are farther in time or pixels from a commonly-used time increment 167, the font sizes for the corresponding time labels of the other time increments 165 also become smaller in a non-linear fashion.

Like the embodiment shown in FIG. 6, FIG. 8 depicts an alternative embodiment wherein the time increment labels for the other time increments 165 progressively 'fade out' (i.e., are displayed as being progressively grayed out) as they are farther in time or pixels from a commonly-used time increment 167. As illustrated in FIG. 8, in this embodiment, the allotted display sizes (i.e., heights in pixels) still become progressively smaller for the other time increments 165 as they are farther in time or pixels from a commonly-used time increment 167, but the corresponding time labels of the other time increments 165 also become fainter to emphasize their relative distance from a commonly-used time increment 167. In one embodiment, there is a non-linear, proportional decrease in size for the other time increments 165 and the faintness of their labels (i.e., hours of the day in the example of FIG. 8) based upon how far (i.e., in hours) a particular other time increment 165 is from a commonly-used time increment 167.

Figure 9:
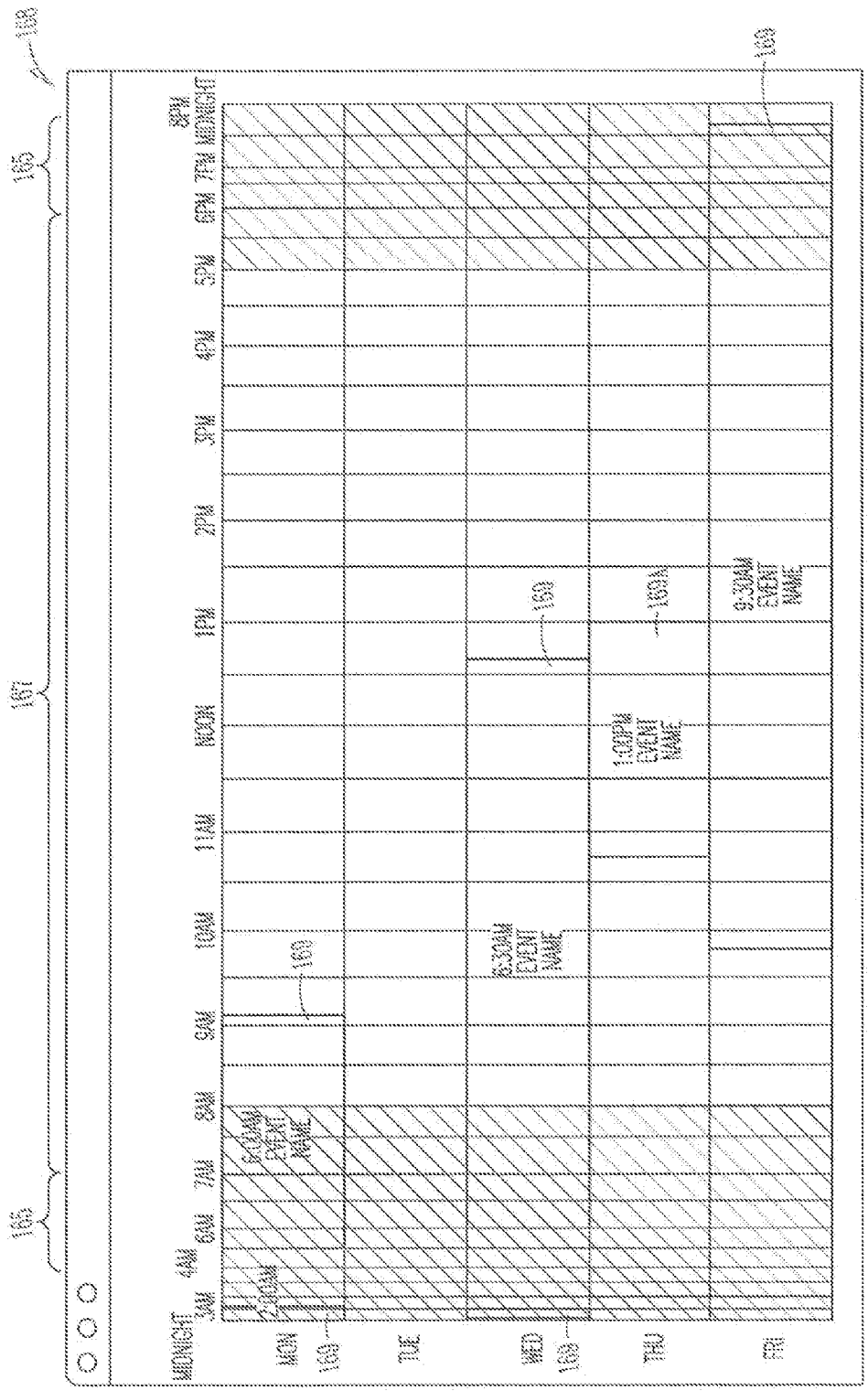
Figure 10:
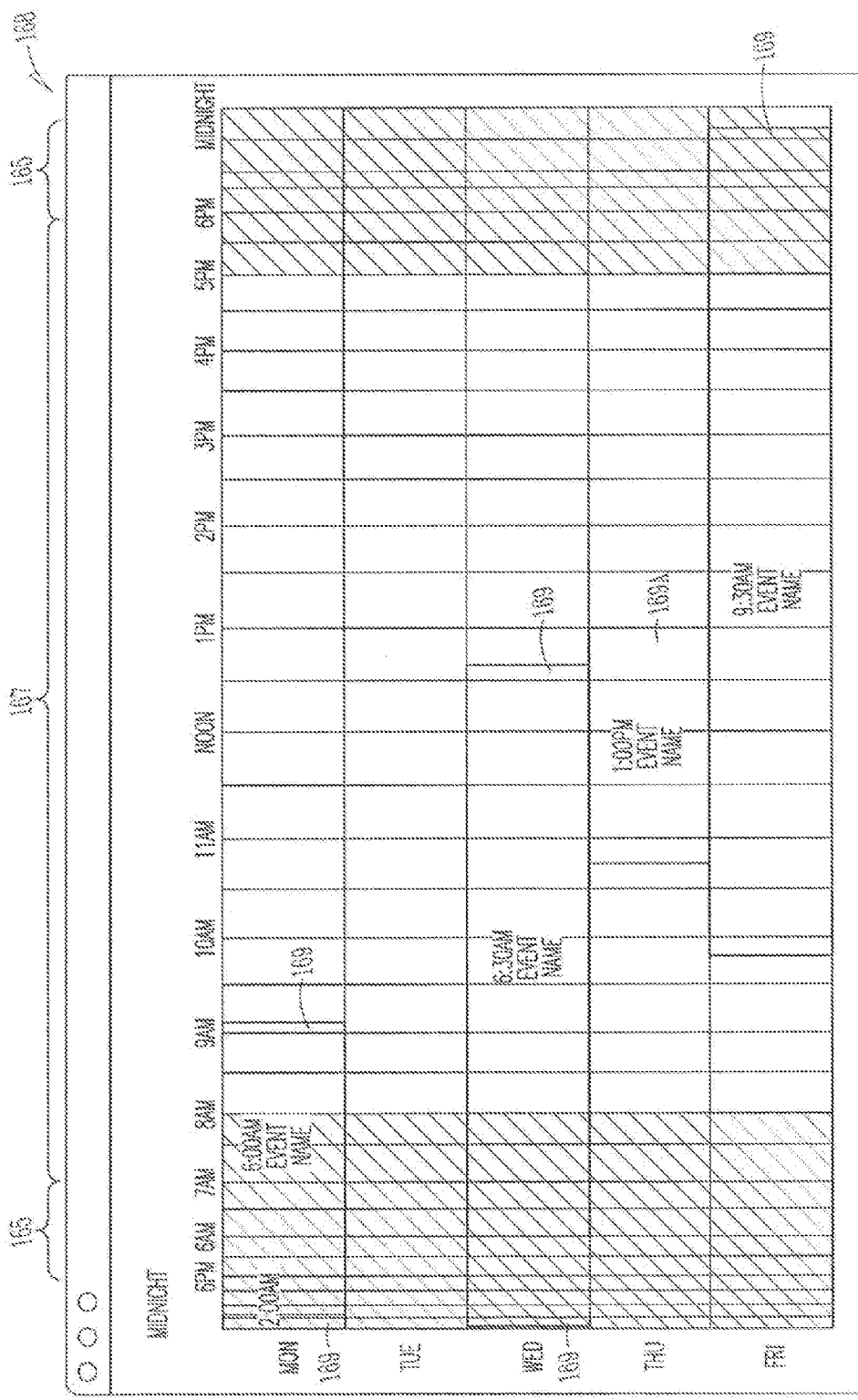

As shown in FIGS. 9 and 10, a horizontally-oriented calendar view in a calendar interface 168 comprises equally-sized columns displayed along a horizontal X-axis for the commonly-used time increments 167 and relatively smaller, compressed columns for other time increments 165, according to embodiments. In the embodiments illustrated in FIGS. 9 and 10, each commonly-used time increment 167 is allotted the same width, in pixels, within calendar interface 168 and columns representing the other time increments 165 are allotted progressively smaller widths the farther they are in time or pixels from a commonly-used time increment 167. This embodiment is further explained below with reference to FIG. 14

Like the embodiments described above with reference to FIGS. 5 and 7, FIG. 9 depicts an embodiment wherein the time increment labels for commonly-used increments 167 are displayed as being larger (i.e., larger font size) than time labels for the other time increments 165. As illustrated in the exemplary embodiment of FIG. 9, as the display sizes (i.e., widths in pixels for columns) become progressively smaller for the other time increments 165 as they are farther in time or pixels from a commonly-used time increment 167, the font sizes for the corresponding time labels of the other time increments 165 also become smaller in a non-linear fashion as they are farther from a time in the center of the calendar view (e.g., Noon). In another embodiment (not shown), the font sizes for the labels of each of the other time increments 165 remain the same, but font sizes for labels of the other time increments 165 become progressively smaller as they are farther in time or pixels from a commonly-used time increment 167.

Like the embodiments described above with reference to FIGS. 6 and 8, FIG. 10 depicts an alternative embodiment wherein the time increment labels for the other time increments 165 progressively 'fade out' (i.e., are displayed as being progressively grayed out) as they are farther in time or pixels from a commonly-used time increment 167. As illustrated in FIG. 10, in this embodiment, the allotted display sizes for columns (i.e., widths in pixels) become progressively smaller for the other time increments 165 as they are farther in time or pixels from a commonly-used time increment 167, and to reinforce the progressive compression of these other time increments 165, their corresponding time labels become fainter. In one embodiment, there is a non-linear, proportional decrease in size for the other time increments 165 and the faintness of their labels (i.e., hours of the day in the example of FIG. 10) based upon how far (i.e., in hours) a particular other time increment 165 is from a commonly-used time increment 167.

By allotting progressively less display space to the other increments 165, the calendar interface 168 illustrated in FIGS. 5-10 can support greater scrolling speeds in pixels per second (pps) of scroll back 734 or scroll forward 736 gestures or inputs.

According to an embodiment, when a scroll bar, cursor, input device 263, user gesture, or other pointer hovers or selects a given time increment (i.e., an hour of a day, a day of a week, or a week of a month), the given increment of time is centered within the calendar view of the calendar interface 168 and is magnified within the display 261 of the mobile device 160. At this point, other time increments 165 and the events 169 occurring within the other time increments 165 are not hidden from view, but are instead displayed in a non-linear fashion with progressively less display space allotted to them based upon their relative distance from the given increment of time.

In accordance with embodiments, if a selection (i.e., clicking) or hovering is detected for a given increment of time, that increment of time is dynamically allotted more display space so as to 'magnify' (i.e., zoom in on) it. For example, in response to detecting that a user or input device has hovered over a calendar object in the calendar interface 168 such as another increment of time 165, an event 169 or 169A, or a commonly-used increment of time 167, the calendar object is dynamically magnified by allotting additional display space within the calendar interface 168. Exemplary methods and systems for such magnification of user interface elements are described in U.S. Pat. No. 5,657,049, entitled, "User Interface for Providing Consolidation and Access," the disclosure of which is incorporated here by reference in its entirety.

IV. NON-LINEAR CALENDAR DISPLAY METHODS

Figure 11:
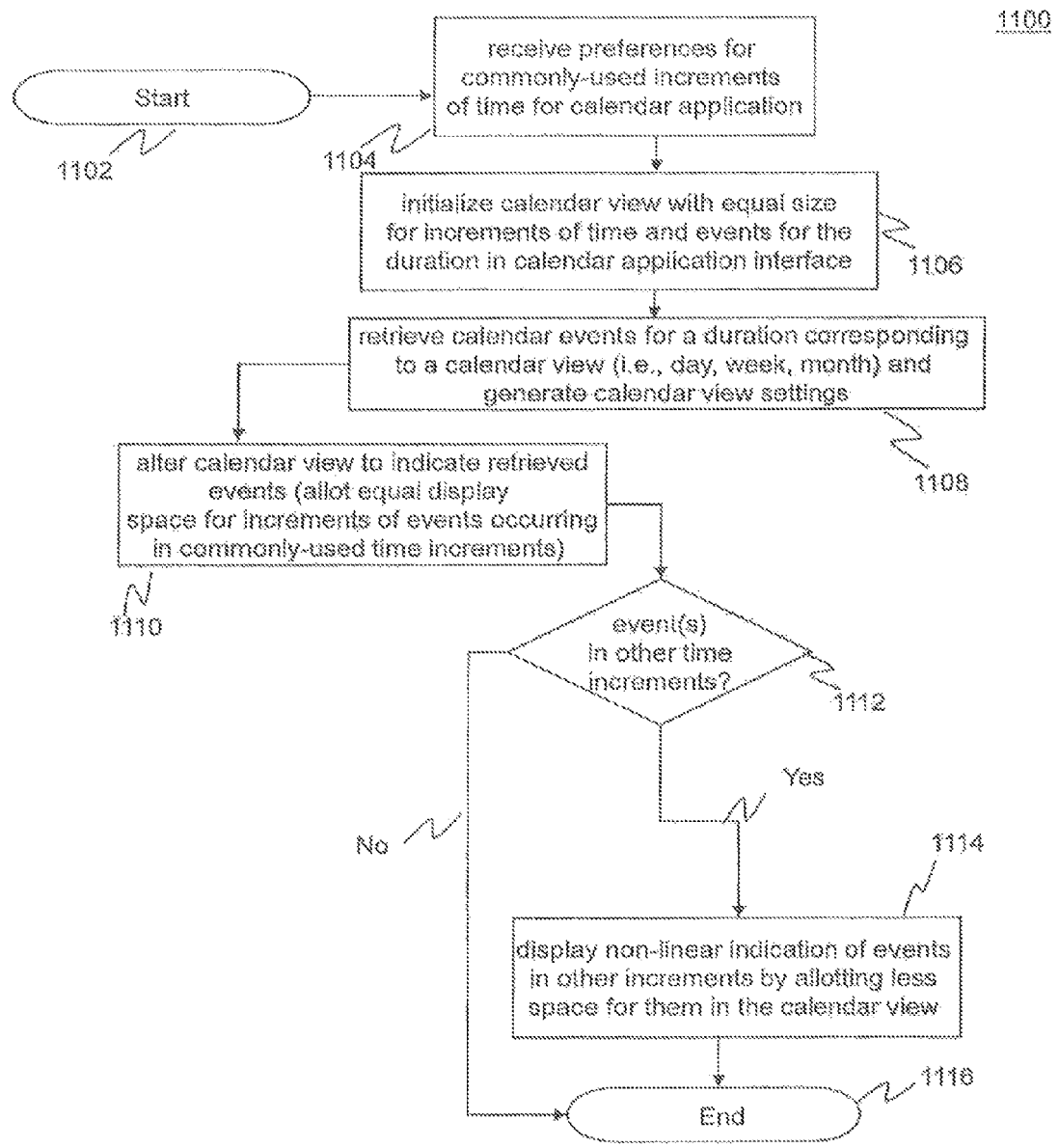
FIGS. 11 and 12 are flowcharts illustrating steps by which calendar data can be displayed in a non-linear fashion on a client device, in accordance with an embodiment of the present invention.
Figure 12:
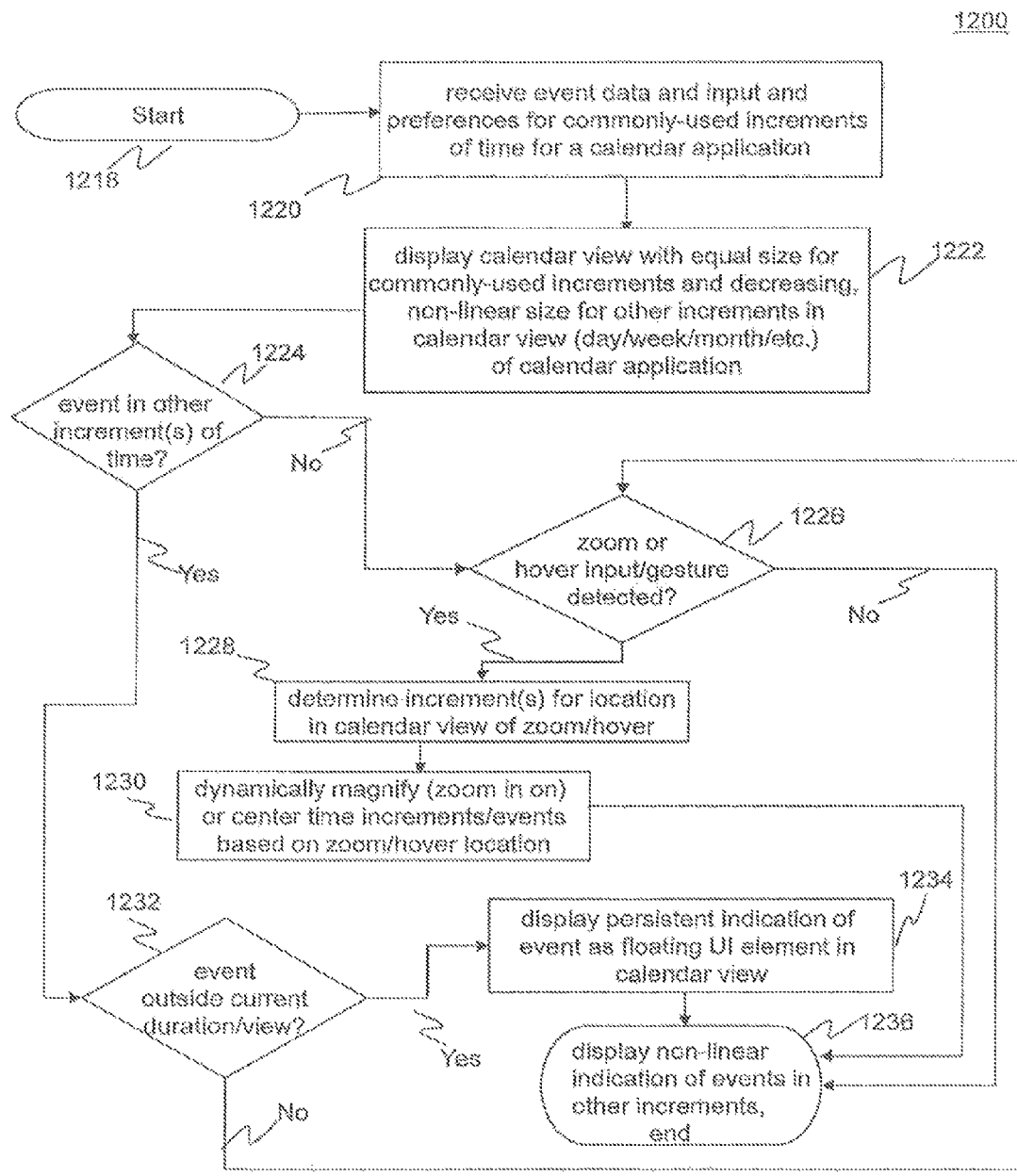

FIGS. 11 and 12 are flowcharts illustrating steps by which calendar data is displayed in a non-linear fashion, in accordance with embodiments of the present invention.

More particularly, the flowchart 1100 illustrates the steps by which core, commonly-used increments of time are allotted equal display size while still displaying other time increments for a given duration in a calendar view without hiding or omitting other, 'non-core,' increments of time.

FIG. 11 is described with continued reference to the embodiments illustrated in FIGS. 1-10. However, FIG. 11 is not limited to those embodiments. Note that the steps in the flowchart do not necessarily have to occur in the order shown.

The method begins at step 1102 and proceeds to step 1104 where calendar input and preferences 123 for commonly-used increments of time for a calendar application are received. In an embodiment, this step can be accomplished by receiving user input via the general preferences interface 472 described above with reference to FIG. 4A. After the calendar input and preferences 123 are received, control is passed to step 1106.

In step 1106, a non-linear calendar view is initialized based on the commonly-used time increments 167 and other calendar preferences, such as, but not limited to, a number of time increments to be displayed for a given duration, received in step 1104. In an embodiment, the calendar view initialization of step 1106 occurs prior to rendering and displaying a non-linear calendar view in the UI of a client device, such as a mobile device 160 or a client device 120. Once the non-linear calendar view is initialized, the method proceeds to step 1108.

In step 1108, event data for events occurring within a selected duration (i.e., a day, week, or month) for the non-linear calendar view initialized in step 1106 are retrieved. As shown in FIG. 11, step 1108 also comprises generating calendar view settings 130 based upon the retrieved events. In one embodiment, this step can be performed by a calendar application server 220 by retrieving events 269 from an enterprise calendar database 226. Once the event data is retrieved and the calendar view settings are generated, the event data and calendar view settings 130 are forwarded to a calendar application, such as a client calendar application 122 or a mobile calendar application 162. After forwarding the event data and calendar view settings 130, the method proceeds to step 1110.

In step 1110, the non-linear calendar view is altered to view to indicate the event data retrieved in step 1108. As shown in FIG. 11, in an embodiment, step 1110 comprises altering the calendar view to display events linearly by allotting equal display space for any time increments of events scheduled during commonly-used time increments. For example, if step 1108 forwarded the event data and calendar view settings 130 to a mobile calendar application 162 hosted on a mobile device 160, step 1110 comprises altering the non-linear calendar view to allot equal display space for events 169A in commonly-used time increments 167. After the non-linear calendar view is altered, control is passed to step 1112.

In step 1112, an evaluation is made regarding whether any of the events retrieved in step 1108 are scheduled in other increments of time. If it is determined that an event occurs wholly or partially in one or more other increments of time, control is passed to step 1114. If it is determined that no event occurs within part of one or more other increments of time, then control is passed to step 1116 where the method ends.

In step 1114, events occurring wholly or partially within one or more other increments of time are displayed in the calendar view in non-linear, compressed manner by allotting less display space as compared to events 169A wholly scheduled during commonly-used time increments. For example, if step 1108 forwarded the event data and calendar view settings 130 to a mobile calendar application 162 hosted on a mobile device 160, step 1114 comprises altering the non-linear calendar view to allot less display space for events 169 scheduled partially or completely within other time increments 165. As described above with reference to FIG. 5, if an event spans across commonly-used and other time increments, its corresponding portions falling within such commonly-used and other time increments are respectively displayed linearly and non-linearly. That is, portions of an event scheduled during or occurring in one or more other increments of time 165 are rendered as being compressed by allotting them less display space relative to portions of the event occurring in commonly-used time increments 167. After the events occurring within one or more other increments of time are displayed, control is passed to step 1116 where the method ends.

FIG. 12 is a flowchart 1200 illustrating the steps by which core, commonly-used increments of time are allotted equal display size while still displaying all time increments for a given duration in an calendar view without omitting or minimizing, 'non-core,' increments of time.

More particularly, the flowchart 1200 illustrates the steps by which both commonly-used increments and other increments of time can be dynamically magnified in a calendar view in response to detecting a selection, zoom request, or hovering in a graphical user interface (GUI). The flowchart 1200 also illustrates steps for displaying a persistent, 'floating' user interface (UI) element in a calendar view FIG. 12 is described with continued reference to the embodiments illustrated in FIGS. 1-11. However, FIG. 12 is not limited to those embodiments. Note that the steps in the flowchart 1200 do not necessarily have to occur in the order shown.

The method begins at step 1218 and proceeds to step 1220 where events and calendar input and preferences 123 for commonly-used increments of time are received. In an embodiment, this step can be accomplished by receiving user input via the general preferences interface 472 and the event editing interface 474 described above with reference to FIGS. 4A and 4B. For example, step 1220 can comprise receiving events 169 and 169A from a mobile calendar application 162 running on a mobile device 160 or from a client calendar application 122 running on a client device 122. After the events and the calendar input and preferences 123 are received, control is passed to step 1222.

In step 1222, a non-linear calendar view is initialized and displayed based on the commonly-used time increments and other preferences, such as a number of time increments for a given duration, received as part of the calendar input and preferences 123. This step comprises initializing the non-linear calendar view and then forwarding retrieved event data and view settings 130 to a calendar application so that the non-linear calendar view can be rendered and displayed in the UI of a client device, such as a mobile device 160 or a client device 120. In step 1222, event data for events occurring within a given duration (i.e., a day, week, or month) for the initialized non-linear calendar view are retrieved.

In an embodiment, step 1222 also comprises generating calendar view settings 130 based upon the events and preferences received in step 1220. In one embodiment, this step can be performed by a calendar application server 220 by retrieving events 269 from an enterprise calendar database 226. Once the event data is retrieved and the calendar view settings are generated, the event data and calendar view settings 130 are forwarded to a calendar application, such as a client calendar application 122 or a mobile calendar application 162.

At this point, the receiving calendar application displays a calendar view by allotting an equal size for commonly-used increments and decreasing, non-linear sizes for other increments in the calendar view over a given duration (i.e., a day, week or month). Once the non-linear calendar view is initialized and displayed, the method proceeds to step 1224.

In step 1224, an evaluation is made regarding whether any of the events received in step 1220 are scheduled in other increments of time. If it is determined that an event occurs wholly or partially within one or more other increments of time, control is passed to step 1232. If it is determined that no event occurs within one or more other increments of time, then control is passed to step 1226.

In step 1226, an evaluation is made regarding whether a zoom input or hovering gesture near one or more time increments or events has been detected. In an embodiment, step 1226 can also comprise determining whether a user, using a touch sensitive display 261 or an input device 263 has selected a calendar object to magnify (i.e., by clicking or pointing to an increment of time or an event). In another embodiment, a hovering gesture is detected in step 1226 by determining that the velocity of the scrolling/navigation in a calendar application has decreased or stopped near one or more time increments or events. If it is determined that a zoom input or hover gesture has been detected, control is passed to step 1228. If no zoom input, selection, or hovering has been detected, then control is passed to step 1236.

In step 1230, the calendar view dynamically magnifies the increment or increments of time determined in step 1228 in response to the zoom input or hovering detected in step 1126. In another embodiment shown in FIG. 12, in addition to magnification, step 1230 can comprise centering a selected increment of time or event within the calendar view of the calendar interface. In accordance with an embodiment, the magnification in step 1230 is performed identically regardless of whether the zoom input, selection, or hovering detected in step 1226 has occurred near an other increment of time 165 or a commonly-used time increment 167.

In other embodiments step 1230 can comprise magnifying an increment or increments of time determined in step 1228 and repositioning and resizing remaining increments of time in the calendar view to accommodate the increased size of the magnified increments of time.

After the selected increment, increments, or events have been magnified in the calendar view, control is passed to step 1236.

In step 1232, an evaluation is made regarding whether any of the events scheduled in other increments of time span a time increment outside of the current calendar view (i.e., extend beyond the currently-displayed duration). For example, step 1224 can comprise determining whether an event 169 either starts during a previous day (i.e., prior to the previous midnight) or ends during a following day (i.e., after midnight of the currently-displayed day). In step 1232 the evaluation can also determine if an event 169 overlaps with another calendar view. If it is determined that an event spans a time increment outside of the current calendar view or overlaps with another calendar view, control is passed to step 1234. If it is determined that no event spans a time increment outside of the current calendar view, then control is passed back to step 1226.

In step 1234, a persistent indication of any event spanning time increments beyond the current calendar view are displayed. In the exemplary embodiment of FIG. 12, this step can comprise displaying such events as a floating UI element, such as an icon or tile, in the calendar view. For example, if an early morning or late evening event spans two days because it either starts before or ends after midnight, step 1234 can comprise persistently displaying this event even if a user scrolls back 734 or scrolls forward 736 in time away from the event. Similarly, if the current calendar view is for a week ending on a Saturday, and a multi-day event overlaps into the following week because it is scheduled to end Sunday, step 1234 can persistently display a representation of the event as floating graphical element even if a user has scrolled back 734 away from that Saturday. In an embodiment, if a user navigates to an event 169 in an other time increment 165, the event can be displayed in its appropriate duration of time (i.e., time slot) with a size corresponding to the size of that other time increment 165. In another embodiment, the persistently-displayed event indicators can also be dynamically magnified in a similar manner as described above with reference to steps 1226-1230. After the persistent indication of the event is displayed, control is passed to step 1236.

In step 1236, any events occurring wholly or partially within other increments of time are displayed in the calendar view in non-linear, compressed manner by allotting less display space as compared to events scheduled during commonly-used time increments. For example, if step 1220 received event data and calendar view settings 130 from a mobile calendar application 162 hosted on a mobile device 160, step 1236 comprises altering the non-linear calendar view to allot less display space for events 169 scheduled partially or completely within other time increments 165.

As described above with reference to FIGS. 5 and 11, if an event spans across commonly-used and other time increments, its corresponding portions falling within the commonly-used and other time increments are displayed in a partially linear fashion (i.e., for portions occurring in commonly-used time increments 167) and a partially non-linear fashion (i.e., for portions occurring in other time increments 165). After the events occurring within one or more other increments of time are displayed, the method ends.

Figure 13:
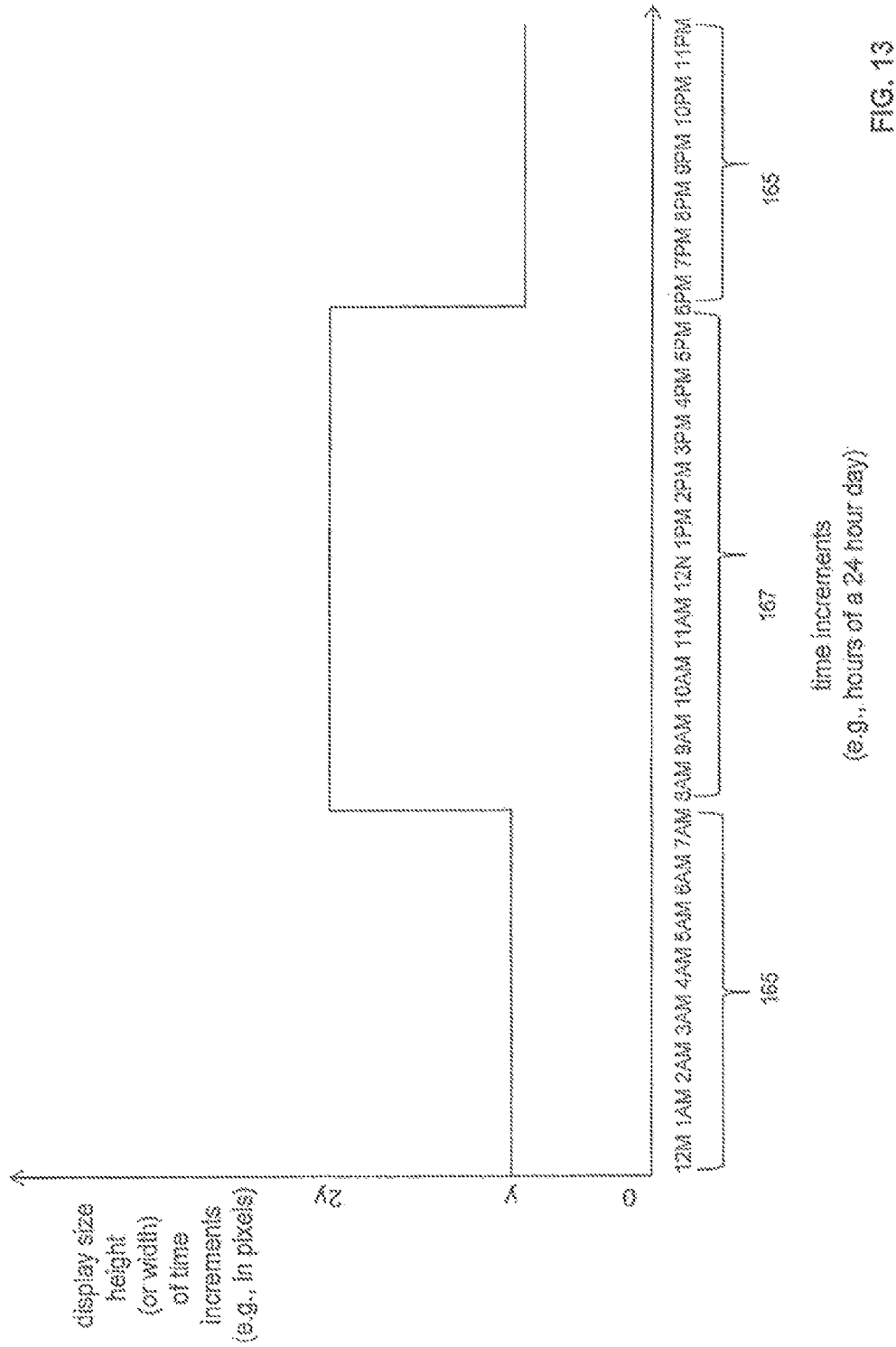
FIGS. 13 and 14 are graphs illustrating relative display sizes allocated to commonly-used and other time increments in calendar view GUIs, in accordance with embodiments of the present invention.
Figure 14:
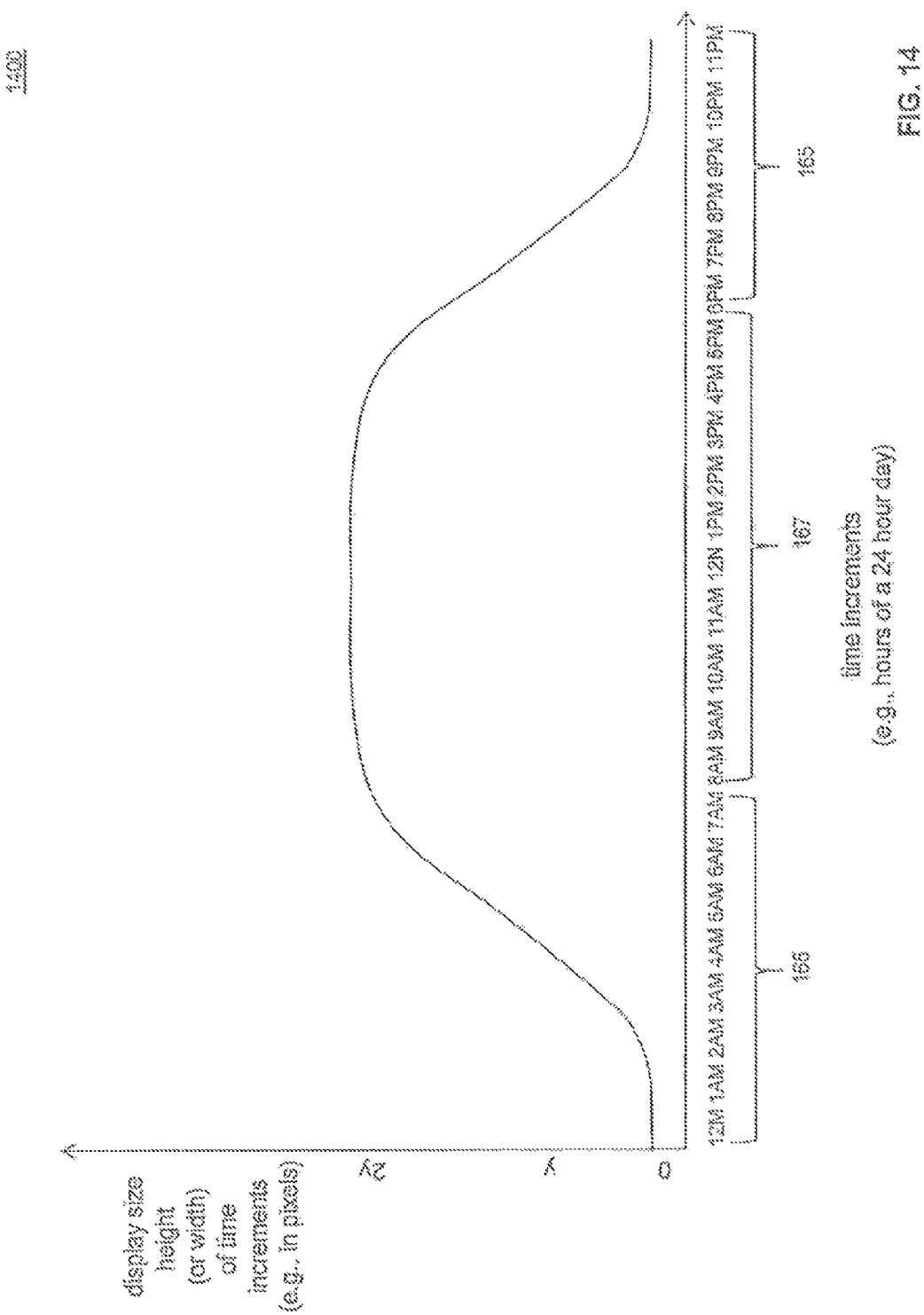

FIGS. 13 and 14 illustrate how relative display sizes allocated to commonly-used and other time increments can vary in calendar view GUIs, in accordance with embodiments of the present invention. FIGS. 13 and 14 are described with continued reference to the embodiments illustrated in FIGS. 1-11. However, FIGS. 13 and 14 are not limited to those embodiments.

It is be understood that the size measurement units (e.g., pixels), time increments (e.g., hours) and duration (e.g. a 24 hour day) shown in FIGS. 13 and 14 are non-limiting embodiments. For example, as described above with regard to FIGS. 1-12, the time increments can be larger or smaller than the hours shown in FIGS. 13 and 14. Also, for example, the duration of a given calendar view rendered in a calendar interface 168 can be larger or smaller than the 24 hour day shown in FIGS. 13 and 14. Likewise, although the display sizes for time increments are shown as pixels in FIGS. 13 and 14, as would be appreciated by persons skilled in the relevant art, the unit of measurement for time increment display sizes (either widths or heights) is not limited to pixels and in alternative embodiments can be millimeters, microns (micrometers), inches, or fractions of such units of length.

FIG. 13 is a graph 1300 showing how display sizes, in pixels, for commonly-used time increments 167 (e.g., the hours of 8 AM to 6 PM) can be twice as large (e.g., 2y pixels) as display sizes allocated to other time increments 165 (e.g., y pixels for the hours of 12 M to 7 AM and 7-11 PM). It is to be understood that the respective sizes allocated to commonly-used time increments 167 and other time increments 165 can vary depending on the platform and display used to render the corresponding calendar interface 168. For example, a display of a mobile device 160 may allot a size of 3y pixels to each commonly-used time increment 167 and y/2 pixels or some smaller fraction thereof if a space on a display 261 is limited. In this way, additional size can be allocated to the commonly-used time increments 167 as needed for legibility on a relatively small display 261 at the expense of further, but equal compression of the other time increments 165. Graph 1300 can be conceptualized as a step function whereby commonly-used time increments 167 are allocated the same, larger height than the other time increments 165. In the example embodiment depicted in FIG. 13, the graph 1300 illustrates how each commonly-used time increment 167 is twice as wide (i.e., for horizontally-oriented calendar views similar to those depicted in FIGS. 9 and 10). As shown in graph 1300, full-sized columns (i.e., that are 2y pixels wide) for each other time increment 165 can be displayed along a horizontal X-axis for the commonly-used time increments 167 and half-sized, compressed columns (i.e., that are y pixels wide) are displayed for the other time increments 165. As with the embodiments illustrated in FIGS. 9 and 10, each commonly-used time increment 167 is allotted the same width, 2y pixels, within a calendar interface 168. However, unlike the embodiments of FIGS. 9 and 10, graph 1300 illustrates an alternative embodiment wherein each column representing one of the other time increments 165 is allotted the same, but smaller width relative to the commonly-used time increments 167.

With continued reference to FIG. 13 and as shown in FIGS. 5-8, vertically-oriented calendar views 168 can comprise equally-sized rows displayed along a vertical Y-axis for each commonly-used time increment 167 (e.g., the hours from 8 AM to 6 PM in graph 1300) and relatively smaller, compressed rows for other time increments 165 (e.g., 12 M to 7 AM and 7-11 PM). Graph 1300 shows how in an exemplary embodiment each commonly-used time increment 167 is allotted the same height (e.g., 2y pixels), within a calendar interface 168 and each other time increment 165 is allotted an equal, but reduced amount of display height (e.g., y pixels) in the calendar view. According to the embodiment shown in FIG. 13, each of the other time increments 165 are equally compressed and given less display space than the commonly-used time increments 167, but maintain the same, compressed size no matter how far in time they are from a commonly-used time increment 167 or the center of a calendar view (e.g., 12 Noon).

FIG. 14 is a graph 1400 showing how display sizes, in pixels, for commonly-used time increments 167 are larger, but not equal as display sizes allocated to other time increments 165 (e.g., y pixels). It is to be understood that the respective sizes allocated to commonly-used time increments 167 and other time increments 165 can vary depending on the platform and display used to render the corresponding calendar interface 168. For example, a display of a mobile device 160 may allot a size of 3y pixels to each commonly-used time increment 167 and y/2 pixels or some smaller fraction thereof if a space on a display 261 is limited. In this way, additional size can be allocated to the commonly-used time increments 167 as needed for legibility on a relatively small display 261 at the expense of further, but equal compression of the other time increments 165.

Graph 1400 can be conceptualized as a 'ramp up' and 'ramp down' curve whereby the allotted display sizes (i.e., heights in pixels in the case of vertically-oriented calendar views 168) become progressively smaller for the other time increments 165 as they are farther in time or pixels from a commonly-used time increment 167 (e.g., 12 Noon in graph 1400) and a 'plateau' is reached at the center of a displayed duration (e.g., 12 N for a 24 hour day as in Graph 1400). In another embodiment, the plateau is for a time increment that falls in middle of designated 'core' or commonly-used hours (i.e., 12 N in the case where 'core' hours are 8 AM through 5 PM). As shown in Graph 1400, the allocated display size for a time increment at the plateau is largest (i.e., 2y pixels) and begins to decrease in a non-linear fashion for each time increment before or after the plateau. This decrease can be gradual such that each of the commonly-used time increments 167 are allotted display sizes approaching the plateau size (i.e., 2y pixels). According to the embodiments of vertically-oriented calendar views 168 illustrated in FIGS. 5-8, the plateau can also be flat such that each commonly-used time increment 167 is allotted the same size (height in pixels). As shown in FIG. 14, allotted display sizes for other time increments 165 decrease rapidly in a non-linear fashion such that other time increments 165 at the extreme 'edges' of a calendar view (i.e., 12 M and 11 PM) are allotted display sizes approaching 0 pixels. According to embodiments, there is a non-linear, proportional decrease in size for the other time increments 165 and their corresponding labels (i.e., hours of the day in the example of FIGS. 5 and 14) based upon how far (i.e., in hours or pixels) a particular other time increment 165 is from a commonly-used time increment 167. In another embodiment, the respective sizes of the other time increments 165 decrease in a progressive, non-linear fashion based on how far they are from the center of a calendar view (i.e., Noon in the example of FIGS. 5 and 14).

With continued reference to FIG. 14, for the horizontally-oriented calendar views 168 such as those illustrated in FIGS. 9 and 10, each commonly-used time increment 167 (e.g., 8 AM to 6 PM) can be allotted the same width (i.e., 2y pixels) within calendar interface 168 along a plateau of the curve of Graph 1400, and columns representing the other time increments 165 are allotted progressively smaller widths the farther they are in time or pixels from a commonly-used time increment 167.

V. EXAMPLE COMPUTER SYSTEM IMPLEMENTATION

FIG. 15 illustrates an example computer system 1500 in which embodiments of the present invention, or portions thereof, may be implemented as computer-readable code. For example, non-linear calendar system architecture 100 and system 200 of FIGS. 1 and 2 can be implemented in computer system 1500 using hardware, software, firmware, non-transitory computer readable media having instructions stored thereon, or a combination thereof and may be implemented in one or more computer systems or other processing systems. Hardware, software, or any combination of such may embody any of the modules and components used to implement the user interface of FIGS. 3-10.

For example, the methods illustrated by the flowcharts 1100 and 1200 of FIGS. 11 and 12 can be implemented in the system 1500. Various embodiments of the invention are described in terms of this example computer system 1500. After reading this description, it will become apparent to a person skilled in the relevant art how to implement the invention using other computer systems and/or computer architectures.

The computer system 1500 includes one or more processors, such as processor 1504. Processor 1504 can be a special purpose or a general purpose processor. Processor 1504 is connected to a communication infrastructure 1506 (for example, a bus, or network).

The computer system 1500 also includes a main memory 1508, preferably random access memory (RAM), and may also include a secondary memory 1510. Secondary memory 1510 may include, for example, a hard disk drive 1512, a removable storage drive 1514, flash memory, a memory stick, and/or any similar non-volatile storage mechanism. Removable storage drive 1514 may comprise a floppy disk drive, a magnetic tape drive, an optical disk drive, a flash memory, or the like. The removable storage drive 1514 reads from and/or writes to a removable storage unit 1518 in a well known manner. Removable storage unit 1518 may comprise a floppy disk, magnetic tape, optical disk, etc. which is read by and written to by removable storage drive 1514. As will be appreciated by persons skilled in the relevant art, removable storage unit 1518 includes a non-transitory computer usable storage medium having stored therein computer software and/or data.

In alternative implementations, the secondary memory 1510 may include other similar means for allowing computer programs or other instructions to be loaded into the computer system 1500. Such means may include, for example, a removable storage unit 1522 and an interface 1520. Examples of such means may include a program cartridge and cartridge interface (such as that found in video game devices), a removable memory chip (such as an EPROM, or PROM) and associated socket, and other removable storage units 1522 and interfaces 1520 which allow software and data to be transferred from the removable storage unit 1522 to the computer system 1500.

The computer system 1500 may also include a communications interface 1524. A communications interface 1524 allows software and data to be transferred between the computer system 1500 and external devices. The communications interface 1524 may include a modem, a network interface (such as an Ethernet card), a communications port, a PCMCIA slot and card, or the like. Software and data transferred via the communications interface 1524 are in the form of signals, which may be electronic, electromagnetic, optical, or other signals capable of being received by a communications interface 1524. These signals are provided to communications interface 1524 via a communications path 1526. A communications path 1526 carries signals and may be implemented using wire or cable, fiber optics, a phone line, a cellular phone link, an RF link or other communications channels.

In this document, the terms "computer program medium," "non-transitory computer readable medium," and "computer usable medium" are used to generally refer to media such as a removable storage unit 1518, a removable storage unit 1522, and a hard disk installed in a hard disk drive 1512. Signals carried over the communications path 1526 can also embody the logic described herein. Computer program medium and computer usable medium can also refer to memories, such as the main memory 1508 and the secondary memory 1510, which can be memory semiconductors (e.g. DRAMs, etc.). These computer program products are means for providing software to the computer system 1500.

Computer programs (also called computer control logic) are stored in the main memory 1508 and/or secondary memory 1510. Computer programs may also be received via communications interface 1524. Such computer programs, when executed, enable computer system 1500 to implement the present invention as discussed herein. In particular, the computer programs, when executed, enable processor 1504 to implement the processes of the present invention, such as the steps in the methods illustrated by flowchart 1100 and 1200 of FIGS. 11 and 1s discussed above. Accordingly, such computer programs represent controllers of the computer system 1500. Where the invention is implemented using software, the software may be stored in a computer program product and loaded into computer system 1500 using removable storage drive 1514, interface 1520, hard drive 1512, or communications interface 1524.

Embodiments of the invention are also directed to computer program products comprising software stored on any computer useable medium. Such software, when executed in one or more data processing device, causes a data processing device(s) to operate as described herein. These embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VI. CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
receiving a selection of a first range of time that is commonly-used for events on a calendar; and
generating for display, on a display device, a calendar view with a representation of a period of time including the first range of time and a second range of time outside the first range of time, wherein:
a first amount of display space is allotted in the calendar view for an increment of time within the first range of time, and the first range of time including a first plurality of increments of time;
a second amount of display space is allotted in the calendar view for the increment of time within the second range of time, the second amount of display space is less than the first amount of display space, and the second range of time including a second plurality of increments of time, wherein the second plurality of increments of time include:
a first increment of time with a first size; and
a second increment of time that occurs after the first increment of time with a second size that is smaller than the first size; and
generating for display, within the calendar view, a calendar event including a first portion of time within the first range of time and a second portion of time within the second range of time, wherein:
increments of time within the first portion of the calendar event are displayed according to the first amount of display space and the increments of time within the second portion are displayed according to the second amount of display space;
the second plurality of increments of time includes a third increment of time that occurs after the second increment of time with a third size that is smaller than the second size;
the first time increment is adjacent to the second time increment;
the third time increment is adjacent to the second time increment and not adjacent to the first time increment; and
the sizes of the first increment of time, the second increment of time, and the third increment progressively decrease as the first increment of time, the second increment of time, and the third increment of time get farther away from a central region of the calendar view.

2. The method of claim 1, wherein each increment of time is an hour, further comprising displaying, in the display, a plurality of one-hour increments in a daily calendar view including each increment of time of the first plurality of increments of time and at least a subset of the second plurality of increments of time.

3. The method of claim 1, wherein each increment of time is an hour, further comprising displaying, in the display, twenty four one-hour increments in a daily calendar view; and
wherein the twenty four one-hour increments are apportioned between the first plurality of increments of time and the second plurality of increments of time.

4. The method of claim 1, wherein the increments of time are arranged in the calendar view in a vertical manner from top to bottom and the first plurality of increments of time are allotted the same height in the calendar view.

5. The method of claim 1, wherein the increments of time are arranged in the calendar view in a horizontal manner from left to right and the first plurality of increments of time are allotted the same width in the calendar view.

6. The method of claim 1, wherein each increment of time in the second plurality of increments of time are allotted proportionally less space relative to their respective distance in the display from a first plurality of increments of time.

7. The method of claim 1, further comprising:
receiving at least one entry for the calendar;
determining whether the at least one entry occurs during the first plurality of increments of time; and
in response to determining that a portion at least one entry occurs during the first plurality of increments of time, displaying the portion of the at least one entry within its corresponding increment of time of the first plurality of increments of time, or in response to determining that the at least one entry occurs during the second plurality of increments of time, displaying the at least one entry proportionally within its corresponding increment of time of the second plurality of increments of time.

8. The method of claim 7, wherein the displaying of the at least one entry occurring during the second plurality of increments of time comprises displaying a floating graphic element indicating the entry, wherein the floating graphic element remains persistently visible in the calendar view even if its corresponding increment of time is not visible in the calendar view.

9. The method of claim 8, further comprising, increasing a size of the floating graphic element in response to determining that a cursor or selection input is proximate to the floating graphic element in the calendar view.

10. The method of claim 1, further comprising centering the first plurality of increments of time in the calendar view.

11. The method of claim 4, further comprising centering the first plurality of increments of time vertically in the calendar view.

12. The method of claim 5, further comprising centering the first plurality of increments of time horizontally in the calendar view.

13. The method of claim 7, wherein the at least one entry and the selected first plurality of increments of time are stored in a local computer readable medium of the computing device and are also stored in a remote computer readable medium of a remote server for synchronization with other computing devices.

14. The method of claim 1, wherein the calendar view includes a user interface element having a menu for user selection of the first plurality of increments of time.

15. The method of claim 7, wherein the calendar view includes a second user interface element for user interaction with the least one entry.

16. The method of claim 1, further comprising generating for display, within the calendar view, a plurality of days, wherein display of each day of the plurality of days includes the first range of time and the second range of time.

17. The method of claim 16, wherein generating for display the plurality of days includes a second calendar event with increments of time all within the first range of time, wherein the increments of time are displayed according to the first amount of display space.

18. The method of claim 16, wherein generating for display the plurality of days includes a third calendar event with increments of time all within the second range of time, wherein the increments of time are displayed according to the second amount of display space.

19. A computer system comprising:
  a display configured to present a calendar view and having a plurality of increments of time and events associated therewith;
  an input device configured to receive a selection of a first plurality of increments of time for a calendar; and
  a processor configured to arrange the calendar view by:
    displaying the first plurality of increments of time linearly by allotting an equal amount of display size to each increment of time within the first plurality of increments of time;
    displaying a second plurality of increments of time by allotting a smaller amount of display size for each increment of time within the second plurality of increments of time than the space allotted for increments of time within the first plurality of increments of time, wherein the second plurality of increments of time includes:
      a first increment of time with a first display size; and
      a second increment of time that occurs after the first increment of time with a second display size that is smaller than the first display size; and
    generating for display, within the calendar view, the one entry including a first portion of time within the first plurality of increments of time and a second portion of time within the second plurality of increments of time, wherein:
      increments of time within the first portion of the calendar event are displayed in the linear fashion and the increments of time within the second portion are displayed with the smaller amount of display size for each increment;
      the second plurality of increments of time includes a third increment of time that occurs after the second increment of time with a third size that is smaller than the second size;
      the first time increment is adjacent to the second time increment;
      the third time increment is adjacent to the second time increment and not adjacent to the first time increment; and
      the sizes of the first increment of time, the second increment of time, and the third increment progressively decrease as the first increment of time, the second increment of time, and the third increment of time get farther away from a central region of the calendar view.

20. The computer system of claim 19, wherein the processor is further configured to arrange the calendar view by:
  decreasing the display size of the increments of time within the second plurality of increments of time in proportion to their respective, relative, decreasing proximity in time to the first plurality of increments of time; and
  centering the first plurality of increments of time in the calendar view.

21. The computer system of claim 19, wherein the input device is further configured to receive an input for pointing to a position within the calendar view and wherein the processor is further configured to:
  vary the display size of at least one of the first plurality of increments of time or the second plurality of increments of time on said display in response to determining that the position is proximate to the at least one of the first plurality of increments of time or the second plurality of increments of time in the calendar view; and
  reposition and resize others of the first plurality of increments of time or the second plurality of increments of time in the calendar view to accommodate the varied size of the at least one of the first plurality of increments of time or the second plurality of increments of time.

22. A non-transitory computer readable medium having instructions stored thereon, that in response to execution by a computing device, cause the computing device to:
  receive a selection of a first range of time that is commonly-used for events on a calendar;
  display a calendar view with a representation of a period of time including the first range of time and a second range of time outside the first range of time,
  wherein less space is allotted in the calendar view for the increments of time in the second range of time than space allotted for the increments of time in the first range of time, wherein the second range of time includes:
    a first increment of time with a first size; and
    a second increment of time that occurs after the first increment of time with a second size that is smaller than the first size; and
  display within the calendar view, a calendar event including a first portion of time within the first range of time and a second portion of time within the second range of time, wherein:
    increments of time within the first portion of the calendar event are displayed according to a first amount of display space allotted for the increments of time within the first range of time, and the increments of time within the second portion are displayed according to a second amount of display space allotted for the increments of time within the second range of time;
    the second plurality of increments of time includes a third increment of time that occurs after the second increment of time with a third size that is smaller than the second size;
    the first time increment is adjacent to the second time increment;
    the third time increment is adjacent to the second time increment and not adjacent to the first time increment; and
    the sizes of the first increment of time, the second increment of time, and the third increment progressively decrease as the first increment of time, the second increment of time, and the third increment of time get farther away from a central region of the calendar view.

23. The non-transitory computer readable medium of claim 22, further comprising instructions for displaying, within the calendar view, a plurality of days, wherein display of each day of the plurality of days includes the first range of time and the second range of time.

24. The non-transitory computer readable medium of claim 23, wherein the instructions for displaying the plurality of days includes a second calendar event with increments of time all within the first range of time, wherein the increments of time are displayed in the linear fashion.

25. The non-transitory computer readable medium of claim 23, wherein generating for display the plurality of days includes a third calendar event with increments of time all within the second range of time, wherein the increments of time are displayed in the non-linear fashion.

\* \* \* \* \*